(12) United States Patent
Greene

(10) Patent No.: US 10,070,187 B2
(45) Date of Patent: Sep. 4, 2018

(54) SIMULTANEOUS OUTPUT OF MULTIPLE TELEVISION SELECTIONS

(71) Applicant: DISH Technologies, LLC, Englewood, CO (US)

(72) Inventor: Gregory Greene, Littleton, CO (US)

(73) Assignee: DISH Technologies, LLC, Englewood, CO (US)

( * ) Notice: Subject to any disclaimer, the term of this patent is extended or adjusted under 35 U.S.C. 154(b) by 0 days.

(21) Appl. No.: 14/950,369

(22) Filed: Nov. 24, 2015

(65) Prior Publication Data

US 2017/0150220 A1 May 25, 2017

(51) Int. Cl.
| | |
|---|---|
| *H04N 5/445* | (2011.01) |
| *H04N 21/462* | (2011.01) |
| *H04N 21/4147* | (2011.01) |
| *H04N 21/426* | (2011.01) |
| *H04N 21/431* | (2011.01) |
| *H04N 21/433* | (2011.01) |

(Continued)

(52) U.S. Cl.
CPC ..... *H04N 21/4622* (2013.01); *H04N 21/4147* (2013.01); *H04N 21/4263* (2013.01); *H04N 21/4312* (2013.01); *H04N 21/4334* (2013.01); *H04N 21/4532* (2013.01); *H04N 21/4586* (2013.01); *H04N 21/4755* (2013.01); *H04N 21/4821* (2013.01); *H04N 21/4858* (2013.01)

(58) Field of Classification Search
CPC ............. H04N 21/4263; H04N 21/431; H04N 21/4312; H04N 21/4347; H04N 21/4402; H04N 21/440263

See application file for complete search history.

(56) References Cited

U.S. PATENT DOCUMENTS

| | | | | |
|---|---|---|---|---|
| 6,415,437 | B1 * | 7/2002 | Ludvig | .............. H04N 5/44543 348/564 |
| 2007/0266403 | A1 * | 11/2007 | Ou | ........................ G06Q 30/02 725/46 |

(Continued)

*Primary Examiner* — Pankaj Kumar
*Assistant Examiner* — Timothy R Newlin
(74) *Attorney, Agent, or Firm* — Kilpatrick Townsend & Stockton, LLP

(57) ABSTRACT

Embodiments described herein provide various techniques for receiving, decoding, and simultaneously outputting multiple television programs and channels via television receivers. In various embodiments, one or more multi-video display modes may be provided by television receivers, including, for example, multi-video channel scanning display mode, a multi-video favorite channel scanning display mode, a multi-video swap command, a multi-video electronic programming guide (EPG), a multi-video digital video recorder (DVR) interface display mode, and a multi-video program/channel search display mode. Different multi-video display modes may be associated with different television data sources, and each display mode may have a corresponding layout that determines the number of different television selections (e.g., television channels and/or programs) to be displayed simultaneously. After selection of a multi-video display mode, the number of television selections may be determined based on the corresponding layout, and the specific television selections may be received, decoded, and output simultaneously to one or more presentation devices.

4 Claims, 17 Drawing Sheets

(51) Int. Cl.
*H04N 21/458* (2011.01)
*H04N 21/485* (2011.01)
*H04N 21/482* (2011.01)
*H04N 21/475* (2011.01)
*H04N 21/45* (2011.01)

(56) References Cited

U.S. PATENT DOCUMENTS

| | | | | |
|---|---|---|---|---|
| 2008/0001970 A1* | 1/2008 | Herrick | .................... | G09G 5/14 |
| | | | | 345/634 |
| 2008/0163059 A1* | 7/2008 | Craner | ............... | H04N 5/44543 |
| | | | | 715/719 |
| 2008/0225167 A1* | 9/2008 | Beermann | ............ | H04N 5/4401 |
| | | | | 348/554 |
| 2008/0263621 A1* | 10/2008 | Austerlitz | ........ | H04N 21/43615 |
| | | | | 725/139 |
| 2008/0313677 A1* | 12/2008 | Lee | .................... | H04N 5/44543 |
| | | | | 725/56 |
| 2009/0260035 A1* | 10/2009 | Yang | .................. | H04N 5/44582 |
| | | | | 725/44 |
| 2010/0153885 A1* | 6/2010 | Yates | .................... | G06F 3/0482 |
| | | | | 715/841 |
| 2010/0153999 A1* | 6/2010 | Yates | .................. | H04N 5/44543 |
| | | | | 725/39 |
| 2010/0242080 A1* | 9/2010 | Henry | .................. | H04N 5/4401 |
| | | | | 725/117 |
| 2012/0284751 A1* | 11/2012 | Kim | ........................ | H04N 5/76 |
| | | | | 725/41 |
| 2013/0332835 A1* | 12/2013 | Mace | .................. | H04N 21/431 |
| | | | | 715/720 |
| 2013/0340005 A1* | 12/2013 | Kwan | .................. | H04N 5/44543 |
| | | | | 725/39 |
| 2014/0053180 A1* | 2/2014 | Shoykher | ................. | H04N 5/44 |
| | | | | 725/14 |
| 2014/0072270 A1* | 3/2014 | Goldberg | ................. | H04N 9/87 |
| | | | | 386/223 |
| 2014/0282061 A1* | 9/2014 | Wheatley | ............. | H04N 21/431 |
| | | | | 715/745 |
| 2015/0181132 A1* | 6/2015 | Kummer | .................. | H04N 5/50 |
| | | | | 348/598 |
| 2015/0312629 A1* | 10/2015 | Bugajski | ............. | H04N 5/44543 |
| | | | | 725/59 |
| 2016/0182834 A1* | 6/2016 | Sivasankaran | ....... | G11B 27/036 |
| | | | | 386/230 |

* cited by examiner

SIMULTANEOUS OUTPUT OF MULTIPLE TELEVISION SELECTIONS

BACKGROUND OF THE INVENTION

"Channel surfing" was a common activity among early generations of analog television service. Rather than referring to a guide listing the available television channels or programs, users often simply picked up a remote control and repeatedly pressed "channel up" or "channel down" until a television program was displayed that caught the user's attention. At least in part due to the changed format of television service provider networks, such channel surfing has become less prevalent. As television service providers have transitioned to digital distribution networks, the ability for user equipment to quickly tune to a particular television channel may have diminished. For instance, due to factors such as video compression, it may take multiple seconds after a television channel is selected before the video for the selected television channel is available for presentation. Due to this delay time, a user may find it frustratingly slow to repeatedly change television channels. Moreover, electronic programming guides (EPGs) and other user interfaces are now available to allow users to quickly retrieve listings of television channels or programs currently available for viewing.

BRIEF SUMMARY OF THE INVENTION

Aspects described herein provide various techniques for receiving, decoding, and simultaneously outputting multiple television programs and channels via television receivers. In some embodiments, a selection of a video display mode for a television receiver may correspond to a request to display multiple simultaneous video outputs. Examples of multi-video display modes that may be determined by or selected for a television receiver may include, for instance, a multi-video channel scanning display mode, a multi-video favorite channel scanning display mode, a multi-video swap command, a multi-video electronic programming guide (EPG), a multi-video digital video recorder (DVR) interface display mode, and a multi-video program/channel search display mode.

According to certain embodiments described herein, different multi-video display modes may be associated with different television data sources, and each display mode may have a corresponding layout that determines the number of different television selections (e.g., television channels and/or programs) to be displayed simultaneously. After a multi-video display mode is selected for and/or determined by a television receiver, the number of television selections may be determined based on the corresponding layout, and the specific television selections may be received, decoded, and output to one or more presentation devices. In some cases, the television selections may correspond to live broadcast channels received from a satellite hub or cable head end, Internet television content received via a network interface from an Internet-based television provider, on-demand television content received from an on-demand television distribution network, and/or previously recorded television programs stored locally in a DVR database. The television receiver may determine a set of television selections to display (e.g., live broadcast channels, or specific television programs), request and receive the selections from their respective television data sources, and then decode and simultaneously output the television selections to a presentation device.

BRIEF DESCRIPTION OF THE DRAWINGS

The present invention is described in conjunction with the appended figures.

Figure 1:
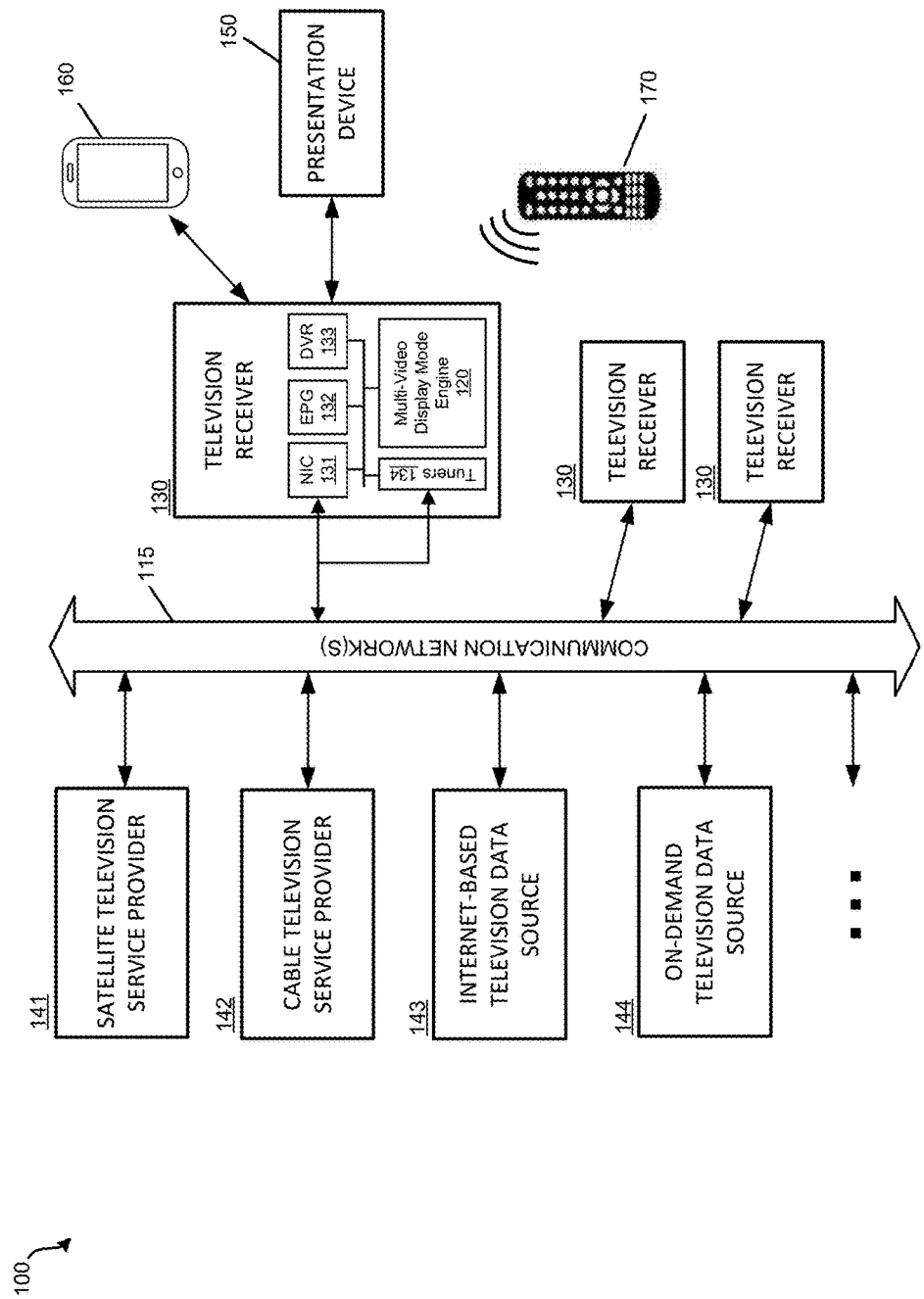
FIG. 1 is a block diagram illustrating a television distribution system, according to one or more embodiments of the present disclosure.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Various techniques (e.g., systems, methods, computer-program products tangibly embodied in a non-transitory computer-readable storage medium, etc.) are described herein for receiving, decoding, and simultaneously outputting multiple television programs and channels via a television receiver. In some embodiments, a selection of a video display mode for a television receiver may correspond to a request to display multiple simultaneous video outputs. Examples of multi-video display modes that may be determined by or selected for a television receiver may include, for instance, a multi-video channel scanning display mode, a multi-video favorite channel scanning display mode, a multi-video swap command, a multi-video electronic programming guide (EPG), a multi-video digital video recorder (DVR) interface display mode, and a multi-video program/channel search display mode.

According to certain techniques described herein, different multi-video display modes may be associated with different television data sources, and each display mode may have a corresponding layout that determines the number of different television selections (e.g., television channels and/or programs) to be displayed simultaneously. After a multi-video display mode is selected for and/or determined by a television receiver, the number of television selections may be determined based on the corresponding layout, and the specific television selections may be received, decoded, and output to one or more presentation devices. In some cases, the television selections may correspond to live broadcast channels received from a satellite hub or cable head end, Internet television content received via a network interface from an Internet-based television provider, on-demand television content received from an on-demand television distribution network, and/or previously recorded television programs stored locally in a digital video recorder (DVR) database. The television receiver may determine a set of television selections to display (e.g., live broadcast channels, or specific television programs), request and receive the selections from their respective television data sources, and then decode and simultaneously output the television selections to a presentation device.

The various embodiments described herein may be implemented on and within one or more different networks and systems, including satellite or terrestrial television distribution systems, telecommunications network systems, television distribution computer networks such as the Internet, cellular and other mobile networking systems, and the like. Therefore, although certain examples below are described in terms of specific types of user equipment (e.g., set-top boxes and other television receivers having digital video recorders, etc.) within specific systems (e.g., satellite television distribution systems), it should be understood that similar or identical embodiments may be implemented using other network systems and architectures (e.g., cable television networks, on-demand distribution networks, Internet television computer networks), as well as other user equipment and devices (e.g., personal computers, servers, routers, gaming consoles, smartphones, etc.).

Referring now to FIG. 1, an example television distribution system 100 is shown on which various aspects of the present disclosure may be implemented. In this example, the television distribution system 100 includes one or more television receivers 130 configured to receive television content from a plurality of television data sources 141-144, and to provide various multi-video display modes with simultaneous output of multiple television selections to presentation devices 150. As discussed below, in some embodiments, television receivers 130 may support one or more different multi-video display modes, including multi-video channel scanning and/or multi-video favorites scanning display modes, a multi-video swap command, multi-video EPG and DVR interfaces, multi-video search interfaces, etc. For each supported multi-video display mode, an associated layout and underlying functionality may be stored and maintained by television receivers 130 and/or elsewhere within the system 100. These layouts and functionality may be used determine the number and presentation of simultaneous television selections to be displayed. As described below in more detail, a television receiver 130 may receive a selection of any one of a plurality of supported multi-video display modes, and based on the selected mode, the television receiver 130 may determine a number (N) and configuration (e.g., size, position, layout, etc.) of simultaneous television selections to display. The television receiver 130 may then determine and receive (or retrieve) a set of N television channels and/or programs, decode the received set of channels/programs, and output the decoded channels/programs to one or more presentation devices 150 using a layout based on the selected multi-video display mode. In various embodiments, the functionality of receiving selections of (and/or automatically determining) a multi-video display mode, storing and retrieving corresponding layouts, determining the number (N) and configuration of simultaneous television selections to display, and then receiving, decoding, and outputting the simultaneous television selections may be performed solely by a television receiver 130, or by a television receiver 130 in combination with the television data sources 141-144 and/or various other components described herein.

In order to perform these features and the additional functionality described below, each of the components and sub-components shown in example system 100, such as television receiver 130, television data sources 141-144, presentation device 150, user computing device 160, etc., may correspond to a single computing device or server, or to a complex computing system including a combination of computing devices, storage devices, network components, etc. Each of these components and their respective subcomponents may be implemented in hardware, software, or a combination thereof. The components shown in system 100 may communicate via communication network 115 (as well as other communication networks 115 not shown in this figure), either directly or indirectly by way of various intermediary network components, such as satellite system components, telecommunication or cable network components, routers, gateways, firewalls, and the like. Although these physical network components have not been shown in this figure so as not to obscure the other elements depicted, it should be understood that any of the network hardware components and network architecture designs may be implemented in various embodiments to support communication between the data sources 141-144, television receiver 130, and other components within television distribution system 100.

Television receivers 130 may be implemented using various specialized user equipment devices, such as cable system set-top boxes, satellite system set-top boxes, WiFi or Internet-based set-top boxes, gaming consoles, and the like. In other examples, television receivers 130 may be implemented using (or integrated into) other computing devices such as personal computers, network routers, tablet computers, mobile devices, etc. Thus, a television receiver 130 may be implemented as a single computing device or a computing system including a combination of multiple computing devices, storage devices, network components, etc. In some examples, a television receiver 130 may correspond to a primary television receiver (PTR) 210 including one or more network interface components (NICs) 131, an electronic programming guide (EPG) user interface component 132, a digital video recorder (DVR) 133, and a plurality of tuners 134 and related hardware/software components (e.g., audio/video decoders, descramblers, demultiplexers, etc.) as described below in more detail in FIGS. 2-3. In some cases, television receivers 130 may include one or more internal data stores and/or external data stores (e.g., external storage systems, database servers, file-based storage, cloud storage systems, etc.) configured to store television content and/or multi-video display mode data. In some embodiments, such data stores may reside in a back-end server farm, storage cluster, and/or storage-area network (SAN). As shown in this example, a multi-video display mode engine 120 also may be implemented within the television receiver 130 to perform various functionality and communications to support multi-video display modes (e.g., determining multi-video display modes, storing and retrieving corresponding layouts, determining numbers and configurations of simultaneous television selections to display, outputting the multi-video display mode with simultaneous television selections, etc.), described in more detail below.

As shown in this example, the television receivers 130 may be configured to communicate with one or more television data sources 141-144 over one or more communication networks 115. In various embodiments and implementations, television data sources 141-144 may include, for example, one or more satellite television service/content providers 141, one or more cable television service/content providers 142, one or more Internet-based television service/content providers 143, and one or more on-demand television service/content providers 144. Although four example television data sources 141-144 are shown in FIG. 1, it should be understood that these examples are illustrative only and non-limiting, and that any number of different television data sources may be used in other embodiments.

Additionally, although the television receivers 130 and television content data sources 141-144 are each illustrated as standalone computer systems in this example, as discussed below, these components may be implemented within and/or integrated into one or more servers or devices of various content distribution systems and other computing architectures. For example, as discussed below in reference to FIGS. 2 and 3, the multi-video display mode engine 120 may be implemented solely within a television receiver 130, or may be implemented within a combination of devices of a satellite television distribution system 200 or other television distribution system 100. For example, the multi-video display mode engine 120 may be implemented via one or more multi-video display mode services 220 operating within servers 218 and/or television receivers 210 and 212 within a satellite television distribution system 200. In other embodiments, the multi-video display mode engine 120 may be implemented similarly, as a standalone component and/or in a distributed manner, within other types of content distribution systems, such as terrestrial television distribution systems, telecommunications network systems, LAN or WAN computer networks (e.g., the Internet), cellular and other mobile networking systems, and any other computing environment configured to provide live content. In any of these examples, the multi-video display mode engine 120 may be implemented within (or integrated into) television receivers 130 as shown in FIG. 1, and/or within one or more content servers (e.g., satellite hubs, cable headends, Internet servers, etc.), one or more local computing devices (e.g., televisions, television receivers, set-top boxes, gaming consoles, standalone home monitoring stations, network routers, modems, personal computers, and the etc.), or a combination of server-side devices/services and local devices/services.

Television content received and/or recorded by a television receiver 130 may be presented via one or more presentation devices 150. Presentation devices 150 may correspond to televisions and other television viewing devices (e.g., home computers, tablet computers, smartphones, etc.). Additionally, various television distribution systems 100 may incorporate other user equipment and devices, such as user devices 160 and remote control devices 170 configured to communicate with associated television receivers 130 and/or presentation devices 150. User devices 160 may include mobile devices such as smartphones and tablet computers, as well as other various types of user computing devices (e.g., personal computers, laptops, home monitoring/security display devices, weather station displays, digital picture frames, smart watches, wearable computing devices, and/or vehicle-based display devices). In some embodiments, user devices 160 may be associated with specific television receivers 130 and/or specific user accounts of television distribution systems 100. As shown in FIG. 1, user devices 160 may be configured to receive data from and transmit data to an associated television receiver 130. Additionally or alternatively, user devices 160 may be configured to communicate directly with one or more television data sources 141-144, so that certain transmissions of television content and other functionality (e.g., user configuration of display modes, notifications, account management, etc.) may potentially bypass the television receiver 130 in some embodiments.

Different presentations devices 150, user devices 160, and remote control devices 170 may include hardware and software components to support a specific set of output capabilities (e.g., LCD display screen characteristics, screen size, color display, video driver, speakers, audio driver, graphics processor and drivers, etc.), and a specific set of input capabilities (e.g., keyboard, mouse, touchscreen, voice control, cameras, facial recognition, gesture recognition, etc.). Different such devices 150-170 may support different input and output capabilities, and thus different types of user notifications and user inputs in response to notifications may be compatible or incompatible with certain devices 150-170. For example, certain notifications generated and output by a television receiver 130, or data sources 141-144 may require specific types of processors, graphics components, and network components in order to be displayed (or displayed optimally) on a user device 160. Additionally, different types of user notifications may include different interactive user response features that require various specific input capabilities for presentation devices 150, user devices 160, and remote control devices 170, such as keyboards, mouses, touchscreens, voice control capabilities, gesture recognition, and the like. In some embodiments, the content of user notifications and/or the user response components may be customized based on the capabilities of the presentation device 150 and/or user device 170 selected to output the notification. Additionally, in some cases, users may establish user-specific preferences, which may be stored in the memory of the television receiver 130, for outputting specific types of user notifications to specific types of presentation devices 150 and/or user devices 160.

The television receivers 130, television data source devices or servers 141-144, presentation devices 150, and user devices 160 each may include the necessary hardware and software components to establish network interfaces and transmit/receive television signals or data streams, multi-video display mode layouts and configuration data, user notifications, etc. Some or all of these devices may include security features and/or specialized hardware (e.g., hardware-accelerated SSL and HTTPS, WS-Security, firewalls, etc.) in order to prevent hacking and other malicious access attempts within the system 100. In some cases, the television receivers 130 may communicate with television data sources 141-144 and/or user devices 160 using secure data transmission protocols and/or encryption for data transfers, for example, File Transfer Protocol (FTP), Secure File Transfer Protocol (SFTP), and/or Pretty Good Privacy (PGP) encryption. Service-based implementations of the system 100 may use, for example, the Secure Sockets Layer (SSL) or Transport Layer Security (TLS) protocol to provide secure connections between the television receivers 130, data sources 141-144, and user devices 160. SSL or TLS may use HTTP or HTTPS to provide authentication and confidentiality.

Communication network(s) 115, through which the television receivers 130, television data sources 141-144, and/or user devices 160 may communicate, may include local area networks (LANs), wide area networks (WANs) (e.g., the Internet), and/or various wireless telecommunications networks. For example, when a multi-video display mode engine 120 is implemented within a television receiver 130, wireless router, modem, or other local user equipment, then communication network 115 may include wireless local area networks (WLANs) or other short-range wireless technologies such as Bluetooth®, mobile radio-frequency identification (M-RFID), and/or other such communication protocols. In other examples, when at least a portion or component of a multi-video display mode service 220 is implemented remotely at a central server, satellite hub, cable headend, or the like, then communication network 115 may include one or more WANs (e.g., the Internet), satellite communication networks, or terrestrial cable networks, and various cellular and/or telecommunication networks (e.g., 3G, 4G or EDGE (enhanced data rates for global evolution), WiFi (IEEE 802.11 family standards, or other mobile communication technologies), or any combination thereof. Additionally, for communication between mobile user devices 160 located remotely to their associated television receivers 130, then communication networks 115 may include WANs, satellite networks, terrestrial cable networks, and/or cellular or other mobile telecommunication networks, etc.

As discussed above, various components of the television distribution system 100 may be implemented as standalone hardware and software systems, and may be implemented within one or more different computer network systems and architectures. For example, in reference to FIGS. 2 and 3, the television distribution system 100 may be implemented using one or more multi-video display mode services 220 executing within server hardware 218 and/or television receiver devices 210 within a satellite television distribution system 200. However, in other embodiments, the components of a television recording system 100 may be incorporated within various different types of content distribution systems. For example, corresponding embodiments to those described in FIGS. 2 and 3 may be implemented within terrestrial cable television distribution systems, telecommunications network systems, LAN or WAN computer networks (e.g., the Internet), cellular and other mobile networking systems, and the like. In any of these examples, a television distribution system 100 may be implemented within (or integrated into) one or more content servers (e.g., satellite hubs, cable head ends, Internet servers, etc.), one or more local computing devices (e.g., televisions, television receivers, set-top boxes, gaming consoles, standalone home monitoring stations, network routers, modems, personal computers, and the etc.), or a combination of server-side devices/services and local devices/services. Thus, although not so limited, an appreciation of various aspects of the present disclosure may be gained from the following discussion in connection with FIGS. 2 and 3.

Figure 2:
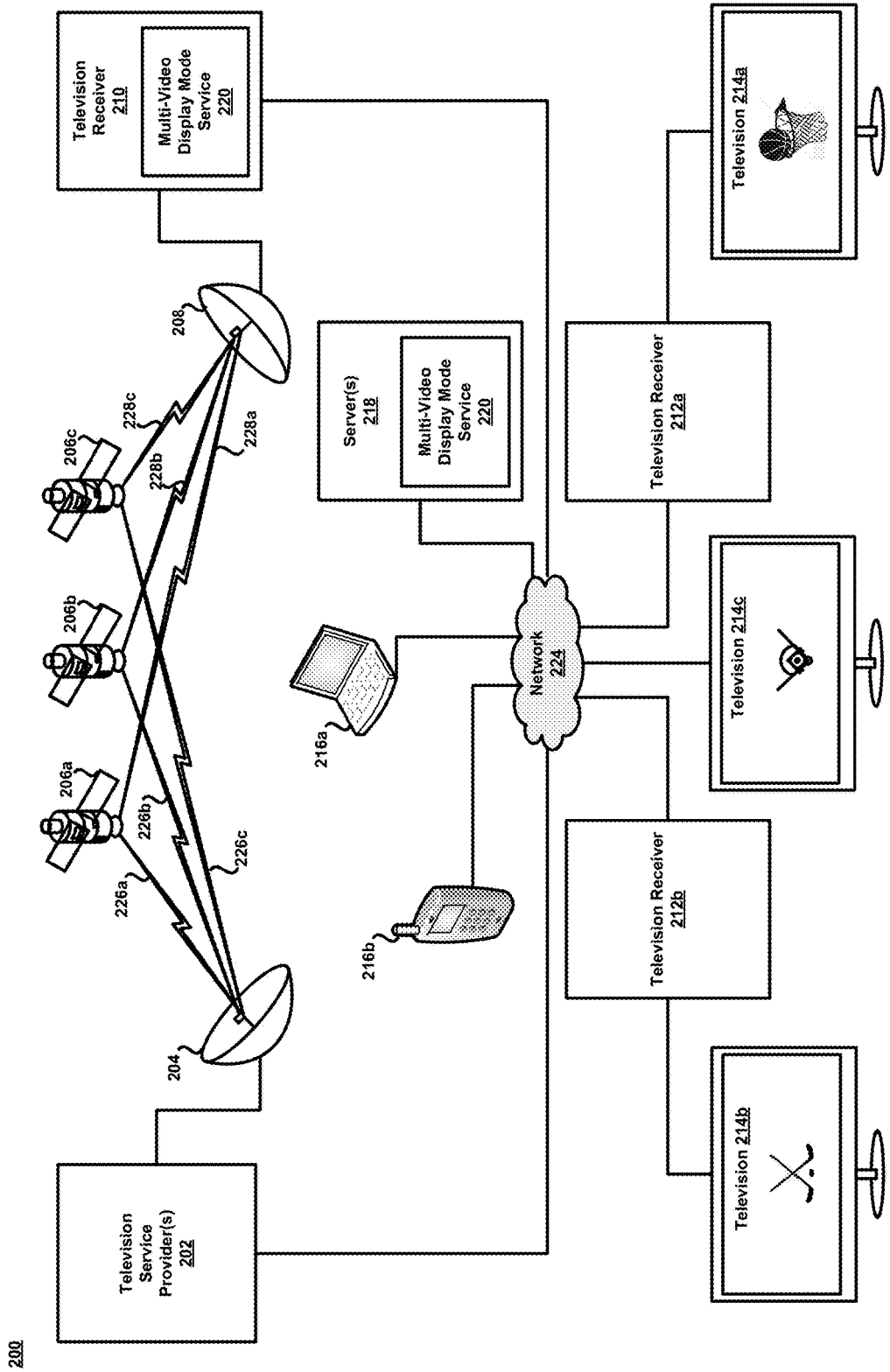
FIG. 2 is a block diagram illustrating an example satellite television distribution system, according to one or more embodiments of the present disclosure.

Referring now to FIG. 2, an example satellite television distribution system 200 is shown in accordance with the principles of the present disclosure. For brevity, the system 200 is depicted in a simplified form, and may include more or fewer systems, devices, networks, and/or other components as desired. Further, number and type of features or elements incorporated within the system 200 may or may not be implementation-specific, and at least some of the aspects of the system 200 may be similar to a cable television distribution system, an IPTV (Internet Protocol Television) content distribution system, and/or any other type of content distribution system.

The example system 200 may include one or more service providers 202, a satellite uplink 204, a plurality of satellites 206a-c, a satellite dish 208, a PTR (Primary Television Receiver) 210, a plurality of STRs (Secondary Television Receivers) 212a-b, a plurality of televisions 214a-c, a plurality of computing devices 216a-b, and at least one server 218 that may in general be associated with or operated by or implemented by the service providers 202. Additionally, the PTR 210 and/or the server 218 may include or otherwise exhibit an instance of multi-video display mode service module 220. The multi-video display mode service modules 220 may be implemented and configured using various hardware and software components discussed above, in order to support the features and perform the functionality of the various television distribution systems 100 discussed above in reference to FIG. 1. Thus, one or more multi-video display mode service modules 220 in this embodiment may be configured to, for example, determine and/or receive selections of multi-video display modes, store and retrieve corresponding layouts, determine numbers and configurations of television selections to display simultaneously, and receive, decode, and output multi-video display modes including multiple simultaneous television selections.

The system 200 may further include at least one network 224 that establishes a bi-directional communication path for data transfer between and among each respective element of the system 200, outside or separate from the unidirectional satellite signaling path. The network 224 is intended to represent any number of terrestrial and/or non-terrestrial network features or elements. For example, the network 224 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among elements of the system 200.

The PTR 210, and the STRs 212a-b, as described throughout may generally be any type of television receiver, television converter, etc., such as a set-top box (STB) for example. In another example, the PTR 210, and the STRs 212a-b, may exhibit functionality integrated as part of or into a television, a DVR (Digital Video Recorder), a computer such as a tablet computing device, or any other computing system or device, as well as variations thereof. Further, the PTR 210 and the network 224, together with the STRs 212a-b and televisions 214a-c, and possibly the computing devices 216a-b, may each be incorporated within or form at least a portion of a particular home computing network. Further, the PTR 210 may be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other examples are possible. For example, one or more of the various elements or components of the example system 200 may be configured to communicate in accordance with the MoCA® (Multimedia over Coax Alliance) home entertainment networking standard. Still other examples are possible.

In practice, the satellites 206a-c may each be configured to receive uplink signals 226a-c from the satellite uplink 204. In this example, each the uplink signals 226a-c may contain one or more transponder streams of particular data or content, such as one or more particular television channels, as supplied by the service provider 202. For example, each of the respective uplink signals 226a-c may contain various media or media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 206a-c.

Further, different media content may be carried using different transponders of a particular satellite (e.g., satellite 206a); thus, such media content may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206a, and etc. Each of these television channels may be scrambled such that unauthorized persons are prevented from accessing the television channels.

The satellites 206a-c may further be configured to relay the uplink signals 226a-c to the satellite dish 208 as downlink signals 228a-c. Similar to the uplink signals 226a-c, each of the downlink signals 228a-c may contain one or more transponder streams of particular data or content, such as various encoded and/or at least partially electronically scrambled television channels, on-demand programming, etc., in accordance with an allotted carrier frequency and bandwidth. The downlink signals 228a-c, however, may not necessarily contain the same or similar content as a corresponding one of the uplink signals 226a-c. For example, the uplink signal 226a may include a first transponder stream containing at least a first group or grouping of television channels, and the downlink signal 228a may include a second transponder stream containing at least a second, different group or grouping of television channels. In other examples, the first and second group of television channels may have one or more television channels in common. In sum, there may be varying degrees of correlation between the uplink signals 226a-c and the downlink signals 228a-c, both in terms of content and underlying characteristics.

Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, ESPN®, and etc. Further, the term "channel," may in some contexts carry a different meaning from or than its normal, plain language meaning. For example, the term "channel" may denote a particular carrier frequency or sub-band which can be tuned to by a particular tuner of a television receiver. In other contexts though, the term "channel" may refer to a single program/content service such as HBO®.

Additionally, a single satellite may typically have multiple transponders (e.g., 32 transponders) each one broadcasting a channel or frequency band of about 24-27 MHz in a broader frequency or polarity band of about 500 MHz. Thus, a frequency band of about 500 MHz may contain numerous sub-bands or channels of about 24-27 MHz, and each channel in turn may carry a combined stream of digital data comprising a number of content services. For example, a particular hypothetical transponder may carry HBO®, CBS®, ESPN®, plus several other channels, while another particular hypothetical transponder may itself carry 3, 4, 5, 6, etc., different channels depending on the bandwidth of the particular transponder and the amount of that bandwidth occupied by any particular channel or service on that transponder stream. Further, in many instances a single satellite may broadcast two orthogonal polarity bands of about 500 MHz. For example, a first polarity band of about 500 MHz broadcast by a particular satellite may be left-hand circular polarized, and a second polarity band of about 500 MHz may be right-hand circular polarized. Other examples are possible.

Continuing with the example scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 228a-c, from one or more of the satellites 206a-c. Based on the characteristics of the PTR 210 and/or satellite dish 208, however, it may only be possible to capture transponder streams from a limited number of transponders concurrently. For example, a particular tuner of the PTR 210 may be configured to tune to a single transponder stream from a transponder of a single satellite at a time.

Additionally, the PTR 210, which is communicatively coupled to the satellite dish 208, may subsequently select via tuner, decode, and relay particular transponder streams to the television 214c for display thereon. For example, the satellite dish 208 and the PTR 210 may, respectively, be configured to receive, decode, and relay at least one premium HD-formatted television channel to the television 214c. Programming or content associated with the HD channel may generally be presented live, or from a recording as previously stored on, by, or at the PTR 210. Here, the HD channel may be output to the television 214c in accordance with the HDMI/HDCP content protection technologies. Other examples are however possible.

Further, the PTR 210 may select via tuner, decode, and relay particular transponder streams to one or both of the STRs 212a-b, which may in turn relay particular transponder streams to a corresponding one of the televisions 214a-b for display thereon. For example, the satellite dish 208 and the PTR 210 may, respectively, be configured to receive, decode, and relay at least one television channel to the television 214a by way of the STR 212a. Similar to the above-example, the television channel may generally be presented live, or from a recording as previously stored on the PTR 210, and may be output to the television 214a by way of the STR 212a in accordance with a particular content protection technology and/or networking standard. Still further, the satellite dish 208 and the PTR 210 may, respectively, be configured to receive, decode, and relay at least one premium television channel to one or each of the computing devices 216a-c. Similar to the above-examples, the television channel may generally be presented live, or from a recording as previously stored on the PTR 210, and may be output to one or both of the computing devices 216a-c in accordance with a particular content protection technology and/or networking standard.

Figure 3:
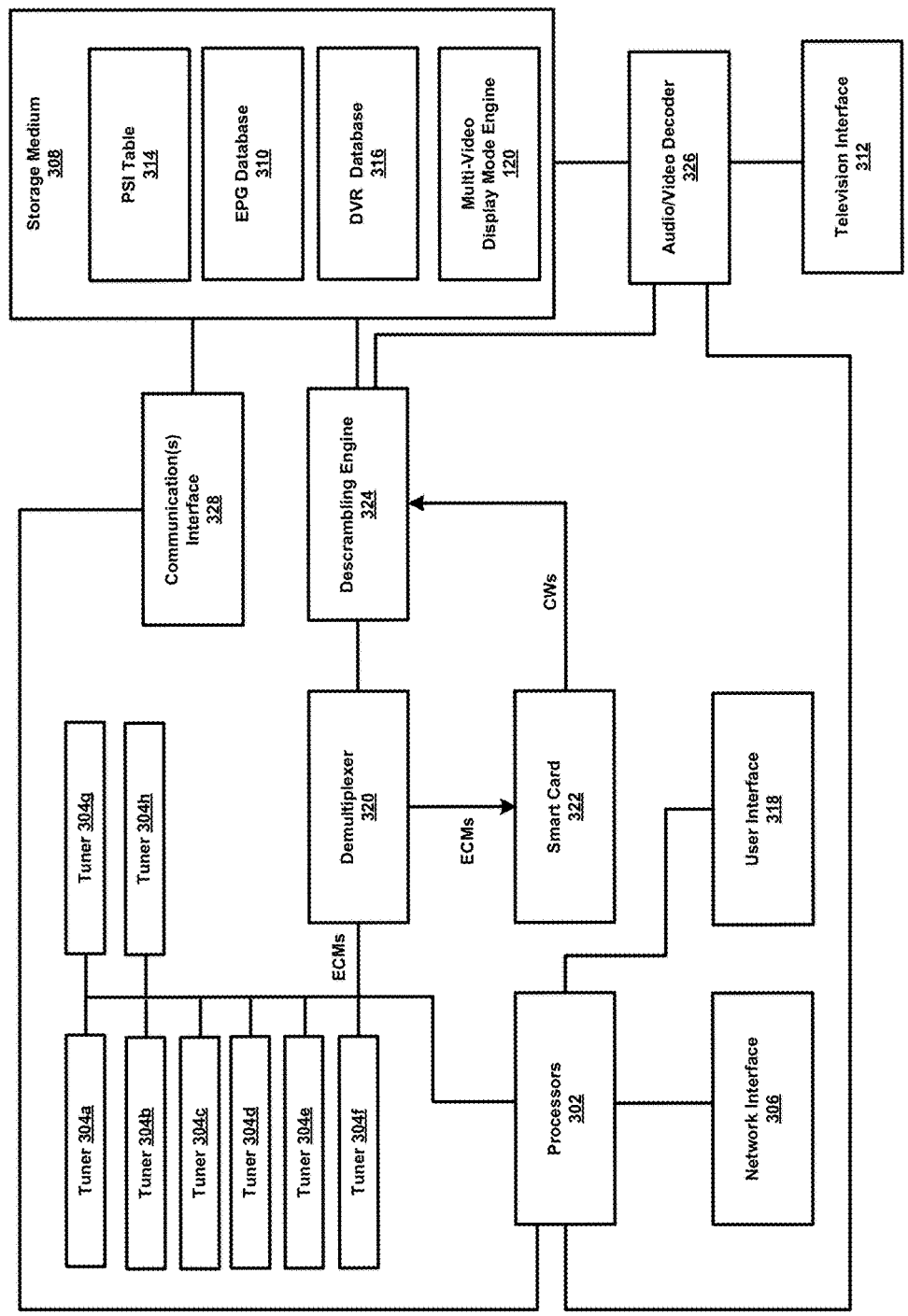
FIG. 3 is a block diagram illustrating an example television receiver device, according to one or more embodiments of the present disclosure.

Referring now to FIG. 3, an example block diagram of the PTR 210 of FIG. 2 is shown in accordance with the disclosure. In some examples, the STRs 212a-b may be configured in a manner similar to that of the PTR 210. In some examples, the STRs 212a-b may be configured and arranged to exhibit a reduced functionality as compared to the PTR 210, and may depend at least to a certain degree on the PTR 210 to implement certain features or functionality. The STRs 212a-b in this example may be each referred to as a "thin client."

The PTR 210 may include one or more processors 302, a plurality of tuners 304a-h, at least one network interface 306, at least one non-transitory computer-readable storage medium 308, at least one EPG database 310, at least one television interface 312, at least one PSI (Program Specific Information) table 314, at least one DVR database 316, at least one user interface 318, at least one demultiplexer 320, at least one smart card 322, at least one descrambling engine 324, at least one decoder 326, and at least one communication interface 328. In other examples, fewer or greater numbers of components may be present. Further, functionality of one or more components may be combined; for example, functions of the descrambling engine 324 may be performed by the processors 302. Still further, functionality of components may be distributed among additional components, and possibly additional systems such as, for example, in a cloud-computing implementation.

The processors 302 may include one or more specialized and/or general-purpose processors configured to perform processes such as tuning to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling.

The tuners 304a-h may be used to tune to television channels, such as television channels transmitted via satellites 206a-c. Each one of the tuners 304a-h may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 304a) may be used to tune to a television channel on a first transponder stream for display using a television, while another tuner (e.g., tuner 304b) may be used to tune to a television channel on a second transponder for recording and viewing at some other time. If multiple television channels transmitted on the same transponder stream are desired, a particular tuner (e.g., tuner 304c) may be used to receive the signal containing the multiple television channels for presentation and/or recording of each of the respective multiple television channels, such as in a PTAT (Primetime Anytime) implementation for example. Although eight tuners are shown, the PTR 210 may include more or fewer tuners (e.g., three tuners, sixteen tuners, etc.), and the features of the disclosure may be implemented similarly and scale according to the number of tuners of the PTR 210.

The network interface 306 may be used to communicate via alternate communication channel(s) with a service provider. For example, the primary communication channel between a service provider 202 of FIG. 2 and the PTR 210 may be via satellites 206a-c, which may be unidirectional to the PTR 210, and another communication channel between the service provider 202 and the PTR 210, which may be bidirectional, may be via the network 224. In general, various types of information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the multi-video display mode engine 120 discussed above. Recorded television programs may be stored using the storage medium 308 and ultimately accessed therefrom.

The EPG database 310 may store information related to television channels and the timing of programs appearing on such television channels. Information from the EPG database 310 may be used to inform users of what television channels or programs are available, popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellites 206*a-c* of FIG. 2. For example, updates to the EPG database 310 may be received periodically or at least intermittently via satellite. The EPG database 310 may serve as an interface for a user to control DVR functions of the PTR 210, and/or to enable viewing and/or recording of multiple television channels simultaneously.

The decoder 326 may convert encoded video and audio into a format suitable for output to a display device. For instance, the decoder 326 may receive MPEG video and audio from the storage medium 308 or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In the example embodiment, eight television channels may be decoded concurrently or simultaneously.

The television interface 312 output a signal to a television, or another form of display device, in a proper format for display of video and play back of audio. As such, the television interface 312 may output one or more television channels, stored television programming from the storage medium 308, such as television programs from the DVR database 316 and/or information from the EPG database 310 for example, to a television for presentation.

The PSI table 314 may store information used by the PTR 210 to access various television channels. Information used to populate the PSI table 314 may be received via satellite, or cable, through the tuners 304*a-h* and/or may be received via the network interface 306 over the network 224 from the service provider 202 shown in FIG. 2. Information present in the PSI table 314 may be periodically or at least intermittently updated. Information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some examples, the PSI table 314 may be divided into a number of tables, such as a NIT (Network Information Table), a PAT (Program Association Table), and a PMT (Program Management Table).

Table 1 below provides a simplified example of the PSI table 314 for several television channels. It should be understood that in other examples, many more television channels may be represented in the PSI table 314. The PSI table 314 may be periodically or at least intermittently. As such, television channels may be reassigned to different satellites and/or transponders, and the PTR 210 may be able to handle this reassignment as long as the PSI table 314 is updated.

TABLE 1

| Channel | Satellite | Transponder | ECM PID | Audio PIDs | Video PID |
|---------|-----------|-------------|---------|------------|-----------|
| 4 | 1 | 2 | 27 | 2001 | 1011 |
| 5 | 2 | 11 | 29 | 2002 | 1012 |
| 7 | 2 | 3 | 31 | 2003 | 1013 |
| 13 | 2 | 4 | 33 | 2003, 2004 | 1013 |

TABLE 1-continued

It should be understood that the values provided in Table 1 are for example purposes only. Actual values, including how satellites and transponders are identified, may vary. Additional information may also be stored in the PSI table 314. Video and/or audio for different television channels on different transponders may have the same PIDs. Such television channels may be differentiated based on which satellite and/or transponder to which a tuner is tuned.

DVR functionality of the PTR 210 may permit a television channel to be recorded for a period of time. The DVR database 316 may store timers that are used by the processors 302 to determine when a television channel should be tuned to and recorded to the DVR database 316 of storage medium 308. In some examples, a limited amount of space of the storage medium 308 may be devoted to the DVR database 316. Timers may be set by the service provider 202 and/or one or more users of the PTR 210. DVR functionality of the PTR 210 may be configured by a user to record particular television programs. The PSI table 314 may be used by the PTR 210 to determine the satellite, transponder, ECM PID, audio PID, and video PID.

The user interface 318 may include a remote control, physically separate from PTR 210, and/or one or more buttons on the PTR 210 that allows a user to interact with the PTR 210. The user interface 318 may be used to select a television channel for viewing, view information from the EPG database 310, and/or program a timer stored to the DVR database 316 wherein the timer may be used to control the DVR functionality of the PTR 210.

Referring back to the tuners 304*a-h*, television channels received via satellite may contain at least some encrypted or scrambled data. Packets of audio and video may be scrambled to prevent unauthorized users, such as nonsubscribers, from receiving television programming without paying the service provider 202. When one of the tuners 304*a-h* is receiving data from a particular transponder of a satellite, the transponder stream may be a series of data packets corresponding to multiple television channels. Each data packet may contain a PID, which in combination with the PSI table 314, can be determined to be associated with a particular television channel. Particular data packets, referred to as ECMs may be periodically transmitted. ECMs may be encrypted; the PTR 210 may use the smart card 322 to decrypt ECMs.

The smart card 322 may function as the CA (Controlled Access) which performs decryption of encryption data to obtain control words that are used to descramble video and/or audio of television channels. Decryption of an ECM may only be possible when the user (e.g., an individual who is associated with the PTR 210) has authorization to access the particular television channel associated with the ECM. When an ECM is received by the demultiplexer 320 and the ECM is determined to correspond to a television channel being stored and/or displayed, the ECM may be provided to the smart card 322 for decryption.

When the smart card 322 receives an encrypted ECM from the demultiplexer 320, the smart card 322 may decrypt the ECM to obtain some number of control words. In some examples, from each ECM received by the smart card 322, two control words are obtained. In some examples, when the smart card 322 receives an ECM, it compares the ECM to the previously received ECM. If the two ECMs match, the second ECM is not decrypted because the same control words would be obtained. In other examples, each ECM received by the smart card 322 is decrypted; however, if a second ECM matches a first ECM, the outputted control words will match; thus, effectively, the second ECM does not affect the control words output by the smart card 322. When an ECM is received by the smart card 322, it may take a period of time for the ECM to be decrypted to obtain the control words. As such, a period of time, such as about 0.2-0.5 seconds, may elapse before the control words indicated by the ECM can be obtained. The smart card 322 may be permanently part of the PTR 210 or may be configured to be inserted and removed from the PTR 210.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 320. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PID. In some examples, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304a-h may be scrambled. The video and/or audio may be descrambled by the descrambling engine 324 using a particular control word. The control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage, such as part of the DVR database 316 for example, and/or to the decoder 326 for output to a television or other presentation equipment via the television interface 312.

The communication interface 328 may be used by the PTR 210 to establish a communication link or connection between the PTR 210 and one or more of the computing systems and devices as shown in FIG. 2 and FIG. 3, discussed further below. It is contemplated that the communication interface 328 may take or exhibit any form as desired, and may be configured in a manner so as to be compatible with a like component or element incorporated within or to a particular one of the computing systems and devices as shown in FIG. 2 and FIG. 3, and further may be defined such that the communication link may be wired and/or or wireless. Example technologies consistent with the principles or aspects of the present disclosure may include, but are not limited to, Bluetooth®, WiFi, NFC (Near Field Communication), HomePlug®, and/or any other communication device or subsystem similar to that discussed below in connection with FIG. 8.

For brevity, the PTR 210 is depicted in a simplified form, and may generally include more or fewer elements or components as desired, including those configured and/or arranged for receiving and analyzing television program recording schedule data and live television broadcast data, and for determining and implemented updated recording schedules, in accordance with the principles of the present disclosure. For example, the PTR 210 is shown in FIG. 3 to include an instance of the multi-video display mode engine 120 as mentioned above in connection with FIG. 1. In other examples, the PTR 210 may include a multi-video display mode service 220, as shown above in FIG. 2, that is configured to communicate with a corresponding service 220 in a television service provider 202 (e.g., 141-144). While shown stored to the storage medium 308 as executable instructions, a multi-video display mode engine 120 (and/or service 220) could, wholly or at least partially, be stored to the processor(s) 302 of the PTR 210. Further, some routing between the various modules of PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules.

Additionally, although not explicitly shown in FIG. 3, the PTR 210 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 210 may be configured to include any number of other various components or logical modules that are implemented in hardware, software, firmware, or any combination thereof, and such components or logical modules may or may not be implementation-specific.

Figure 4:
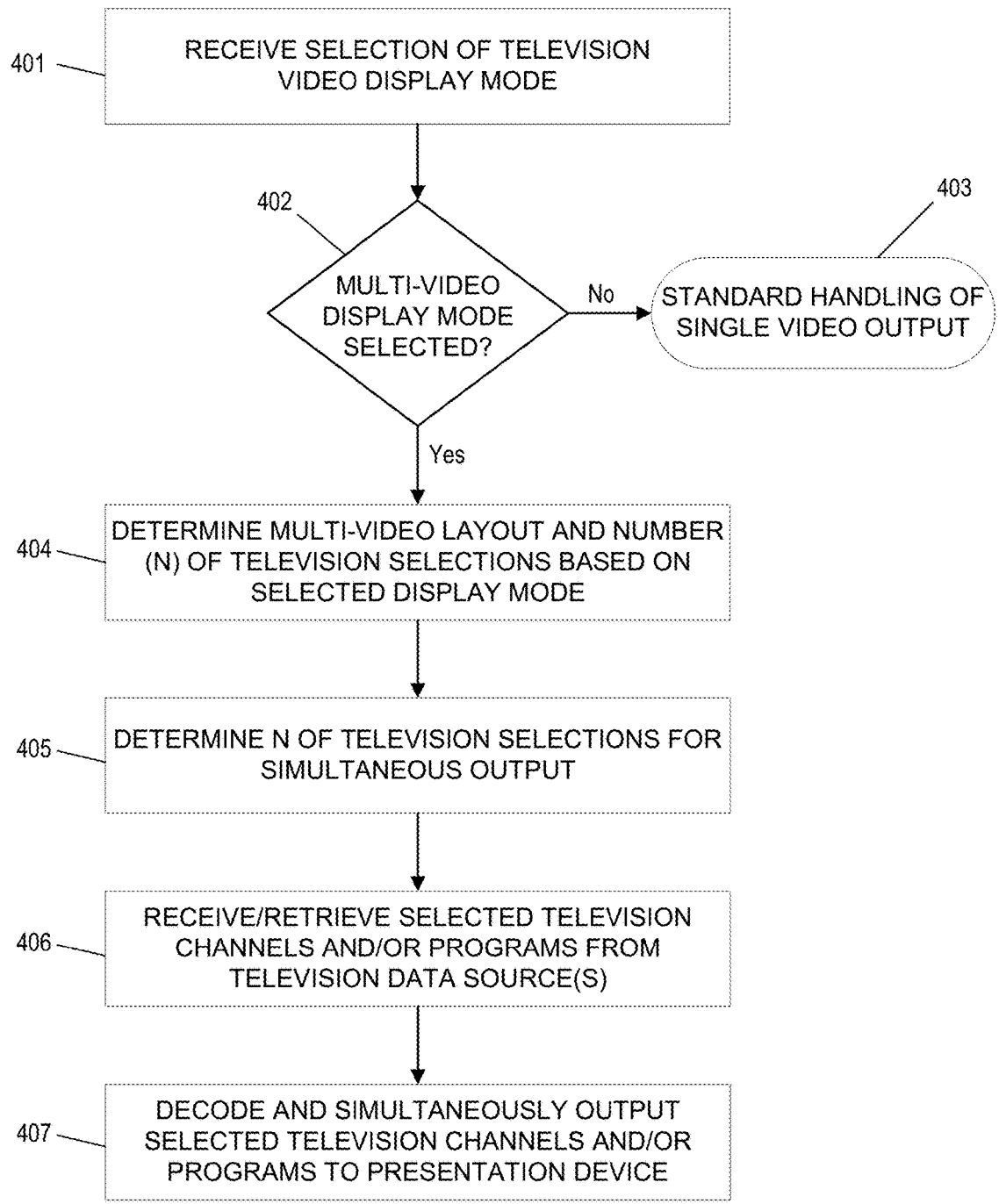
FIG. 4 shows a flow diagram illustrating an example process of determining a multi-video layout mode, and simultaneously outputting multiple independent television selections in accordance with the determined multi-video layout mode, according to one or more embodiments of the disclosure.

Referring now to FIG. 4, a flow diagram is shown illustrating an example process of determining a multi-video layout mode and simultaneously outputting multiple independent television selections in accordance with the determined multi-video display mode. As described below, the steps in this process may be performed by one or more components in the television distribution system 100 and other related systems and components described above. For example, a television receiver 130 may perform the steps shown in FIG. 4, operating autonomously or in communication with one or more television data sources 141-144 and/or user devices 150-170. In other cases, different combinations of devices may be used to perform the steps described below. It should be understood that the techniques described herein for determining multi-video layout modes, outputting multiple television selections simultaneously in accordance with determined modes, and other features described herein need not be limited to the specific systems and hardware implementations described above in FIGS. 1-3, but may be performed within other computing environments comprising other combinations of hardware and software components. For example, this example process may be implemented not only within satellite television distribution systems, but also within terrestrial television distribution systems, telecommunications systems, Internet-based content distribution networks, cellular and other mobile networking systems, and various combinations of such systems.

In step 401, a selection of a television video display mode may be received, for example, by a television receiver 130. The television video display mode may correspond to the user interface, display output configuration, and/or screen layout used for outputting television selections (e.g., television channels or programs) to a television presentation device. Examples of television video display modes may include, for instance, a standard single-channel or single-program television output mode, a single-channel or single-program television output mode having a graphical overlay to provide programming details, an EPG user interface display mode, a DVR user interface display mode, a television program search user interface display mode, a picture-in-picture (PiP) display mode, etc. Additional examples of television video display modes include the various multi-video display modes discussed below (e.g., multi-video channel scanning display mode, multi-video favorite channel scanning display mode, multi-video EPG display mode, multi-video DVR display mode, and multi-video program/channel search display mode).

In some cases, the receipt of a video display mode in step 401 may be based on a user input received via a presentation device 150, user device 160, or remote control device 170. For instance, a user may manually invoke an EPG, DVR user interface, or program search user interface. Users also may manually exit any of those display modes to return to a standard (e.g., non-GUI overlay) display mode. In other cases, the television receiver 130 may automatically determine and invoke a default display mode in response to an occurrence such as the receiver 130 being initially turned on, a channel change, a program ending, a user reminder or notification being triggered, etc.

In step 402, the television receiver 130 may determine whether the video display mode selected or determined in step 401 corresponds to a single-video display mode or one of the multi-video display modes described herein. A single video display mode corresponds to a television video display mode configured to output, at most, one television selection at a time. In contrast, multi-video display modes, such as those described below, refer to television video display modes that are configured to output two or more television selections simultaneously to presentation device(s) 150. A television selection may refer to a television channel or program, and may include television channels/programs from various television data sources 141-144 as well as previously received channels/programs stored on the receiver 130 or other associated storage devices.

If the selected display mode is a single-video display mode (402:No), for example, standard television viewing mode with or without graphical overlays, a single-video EPG display mode, a single-video DVR user interface, etc., then the process may continue to step 403 for standard handling of the single-video output by the television receiver 130. However, if the selected display mode is a multi-video display mode (402:Yes), then the process may continue to steps 404-407, discussed below. Several examples of multi-video display modes are described in more detail below, including multi-video channel scanning display mode, multi-video favorite channel scanning display mode, multi-video EPG display mode, multi-video DVR display mode, and multi-video program/channel search display mode, among others.

In step 404, the television receiver 130 may determine a display screen layout and the number (N) of television selections to be output within the layout, based on the selected multi-video display mode. The display screen layout may include properties such as window size and positioning, graphical overlays, user interface components and field, look-and-feel characteristics of the display, and the like. Various examples of different layouts for multi-video display modes are shown in FIGS. 6A-6C, 8A-8B, 10A-10C, 12, 14, and 16, described below. For example, the selection of a multi-video channel scanning display mode may correspond to a six-channel grid layout such as the one shown in FIGS. 6A-6C, whereas a multi-video channel EPG display mode may correspond to a five-channel layout within an EPG user interface such as the one shown in FIG. 12. Different display screen layouts may be associated with different possible selections of multi-video display modes. The properties of a display screen layout, such as window sizes and positions, graphical overlays, user interface components, and any other data needed to render and output the selected multi-video display mode to a presentation device 150, may be stored locally at the television receiver 130, and/or may be received from one or more television data sources 141-144.

In some cases, the determination of the display screen layout may also determine the number (N) of television selections to be simultaneously output to and displayed on the presentation device 150. For example, multi-video channel scanning display mode shown in FIGS. 6A-6C may be preconfigured as a six-channel display mode which uses six windows and simultaneously outputs six different television selections. Similarly, the multi-video EPG display mode shown in FIG. 12 may be preconfigured as a five-channel display mode.

In other cases, the number (N) of television selections to be simultaneously output may be determined independently from the determination of the display screen layout. For example, a multi-video channel scanning display mode, such as that shown in FIGS. 6A-6C, need not be limited to a six-channel output but instead may simultaneously output a different number of television selections (e.g., 2, 3, 4, 5, 7, 8, etc.) based on a number of additional factors. Examples of factors that the television receiver 130 may use to determine the number (N) of television selections to be simultaneously output include, in addition to the determined layout itself, the display characteristics (e.g., size, resolution, screen shape, etc.) of the associated presentation device 150, the hardware and software capabilities of the 130 receivers (e.g., number of tuners and/or decoders, processing capabilities, etc.), and the quality of the video streams received from various television data sources 141-144. Additionally or alternatively, the number (N) of television selections to be simultaneously output may be determined based on preferences of end user and/or preferences of television service providers. For example, the layouts for some multi-video display modes may be user-configurable to output more or less television selections, to accommodate user viewing preferences or the content quality preferences of television services providers.

In step 405, after identifying the display screen layout to be used and the number (N) of television selections to be simultaneously output, the television receiver 130 may determine the specific television selections (e.g., television channels or programs) to be simultaneously output within the identified layout. For example, in a multi-video channel scanning mode, the specific television selections determined in step 405 may correspond to a block of adjacent television channels received from a satellite or cable television service provider 141-142. As another example, in a multi-video DVR display mode, the specific television selections determined in step 405 may correspond to a number of previously recorded television programs that may be retrieved from a local DVR database 316. Several additional examples of determining specific sets of television selections for simultaneous output are discussed in reference to the different multi-video display modes examples described below.

In step 406, the television receiver 130 may receive and/or retrieve the multiple different television selections determined in step 405. As described below in more detail, the multiple television selections may be received/retrieved from a single television data source or from a combination of multiple data sources. For example, the television selections determined in step 405 may include a first television channel provided by a satellite television service provider 141, a second television channel provided by a cable television service provider 141, a previously recorded television program stored locally in a DVR database 316, a television program requested and received from an Internet-based streaming television service 143, and so on.

In step 407, the television receiver 130 may decode and simultaneously output the multiple different television selections received and/or retrieved in step 406 to one or more presentation devices 150. Depending on the television service providers 141-144 and other television data sources (e.g., DVR database 316, etc.) various combinations of the hardware and software infrastructure of the television receiver 130 described above in FIG. 3 may be used to simultaneously output the television selections in step 407. For example, television selections received via the plurality of tuners 304 may be demultiplexed, descrambled, and/or decrypted as necessary, using the various receiver infrastructure components described above (e.g., demultiplexer 320, descrambler 324, decoder 326, network interface 306, processors 302, etc.). Each of the received television selections, including live television channels, streaming television content, previously recorded programs, etc., then may be decoded using one or more A/V decoders 326 and integrated into the selected display screen layout.

The generation of the multi-video display may be performed locally at the television receiver 130, for example, by the multi-video display mode engine 120, through processes of integrating the decoded television selections into the appropriate locations of the determined display screen layout. Each individual video window within the multi-video display may be independent of the others, so that it may be modified or replaced by the television receiver 130 on-the-fly without affecting any of the other video windows within the multi-video display. In some cases, the television receiver 130 may downconvert (e.g., convert to a lower resolution video stream) one or more of decoded television selections before outputting the multi-video display to the presentation device(s) 150. The magnitude of the downconversion may be based on the initial resolution of the television selection and the desired lower resolution, which may depend on the size and shape of the window within which the particular television selection is to be displayed within the multi-video display layout, as well as the display characteristics (e.g., screen size, screen resolution, etc.) of the presentation device 150.

FIGS. 5-16, described in more detail below, provide several specific examples based on the general process described in FIG. 4 for determining a multi-video display mode and outputting a multi-video display layout with multiple simultaneous television selections. These figures include flowcharts representing processes for determining and outputting specific types of multi-video display modes, along with example illustrations of corresponding multi-video layouts that may be output to presentation devices 150 for each specific type of multi-video display mode.

Figure 5:
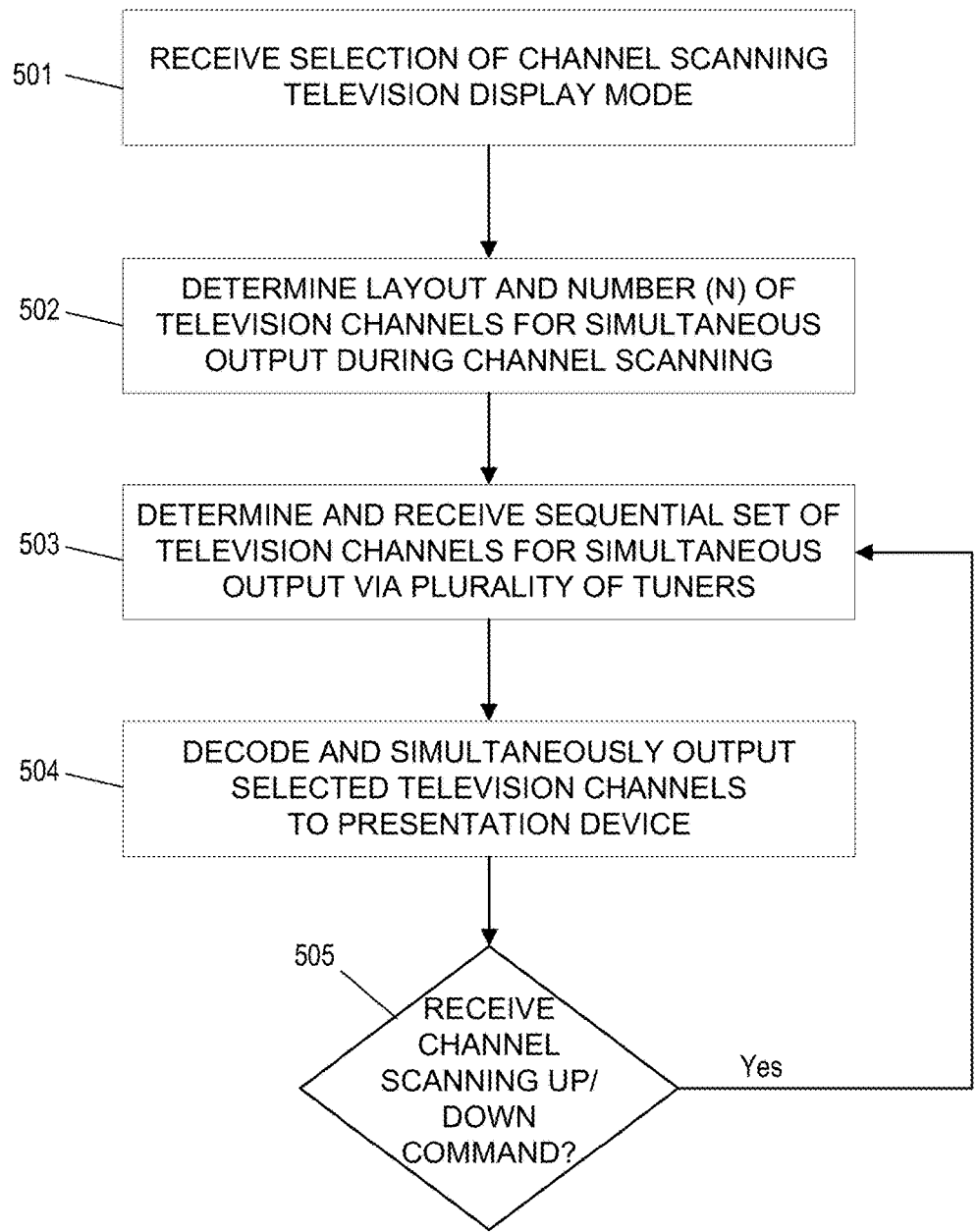
FIG. 5 shows a flow diagram illustrating an example process of providing a multi-video television channel scanning/surfing display mode, according to one or more embodiments of the disclosure.

Referring now to FIG. 5, a flow diagram is shown illustrating an example process of determining and implementing a multi-video television channel scanning (or multi-video channel surfing) display mode. As in FIG. 4, the steps in this process may be performed by a television receiver 130 and/or related components within the various television distribution systems described above. However, the techniques described herein for determining and outputting a multi-video television channel scanning display mode need not be limited to the specific systems and hardware implementations described above in FIGS. 1-3, but may be performed within other computing environments comprising other combinations of hardware and software components.

In step 501, the television receiver 130 may receive a selection of multi-video television channel scanning display mode (also referred to as multi-channel surfing mode). Step 501 may correspond to steps 401-402 in FIG. 4. In some cases, a multi-video television channel scanning mode may be specifically selected by a television viewer, for example, by inputting a button or series of buttons on the remote control 170 to request multi-video television channel scanning/surfing. In other cases, the multi-video television channel scanning display mode may be determined automatically by the television receiver 130, as a default mode and/or based on the factors discussed above. For example, when a television viewer performs a standard channel scanning/channel surfing action via remote control 170, the television receiver 130 may be configured to automatically initiate multi-video channel scanning rather than single-video channel scanning In step 502, the television receiver 130 may determine the layout and number (N) of television channels to be simultaneously output during the multi-video television channel scanning/surfing mode. Step 502 may correspond to step 404 in FIG. 4. As discussed above, the layout data for a multi-video television channel scanning/surfing mode (e.g., number of windows, window size, window configuration, etc.) may be stored television receiver 130. In some cases, the number (N) of television channels to be simultaneously output within the multi-video television channel scanning/surfing display mode may be configurable by the viewer via a remote control 170 or user device 160, and/or may be configured by the television receiver 130 based on the hardware and software infrastructure of the television receiver 130 (e.g., number of tuners, decoding capabilities, etc.) and/or the associated presentation devices 150 (e.g., screen size, resolution, etc.).

Figure 6A:
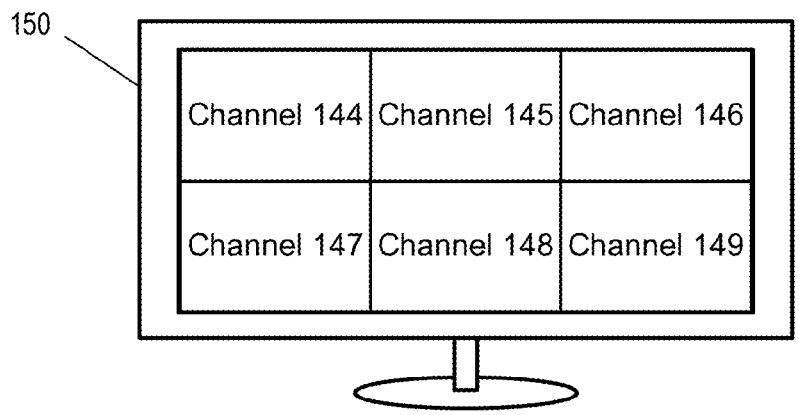
FIGS. 6A-6C show a presentation device displaying an example layout for a multi-video television channel scanning/surfing mode, according to one or more embodiments of the disclosure.

In step 503, the television receiver 130 may determine and receive the specific set of television channels to be output simultaneously, and in step 504, the received channels may be decoded, integrated into the determined layout for multi-video television channel scanning/surfing, and output to one or more presentation devices 150. These steps may correspond to steps 405-407 in FIG. 4. When the determined display mode is a multi-video television channel scanning/surfing mode, the television receiver 130 may identify a sequential block of channels based on the current or most recent channel viewed. For example, FIG. 6A shows an example layout for a multi-video television channel scanning/surfing mode. In this example, the number (N) and layout of television channels determined (in step 502) is a six-channel 2×3 grid, and the channels selected (in step 503) are the sequential block of television channels 144-149. The selected channels may be received via the plurality of tuners 304 (in step 504), and then decoded and output to the presentation device 150 using the various receiver components and techniques discussed above.

Figure 6B:
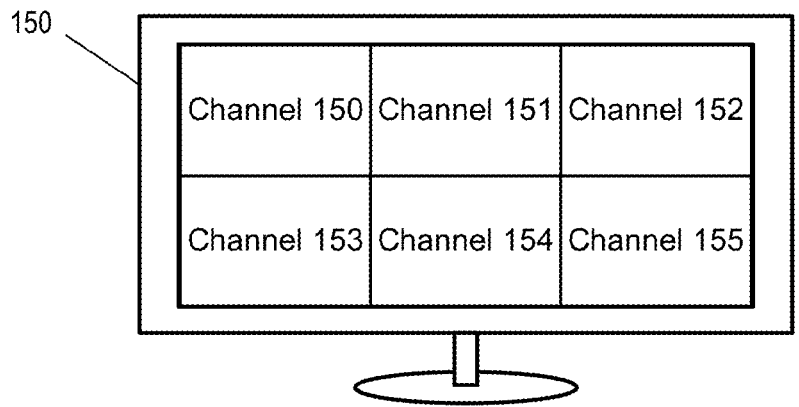
Figure 6C:
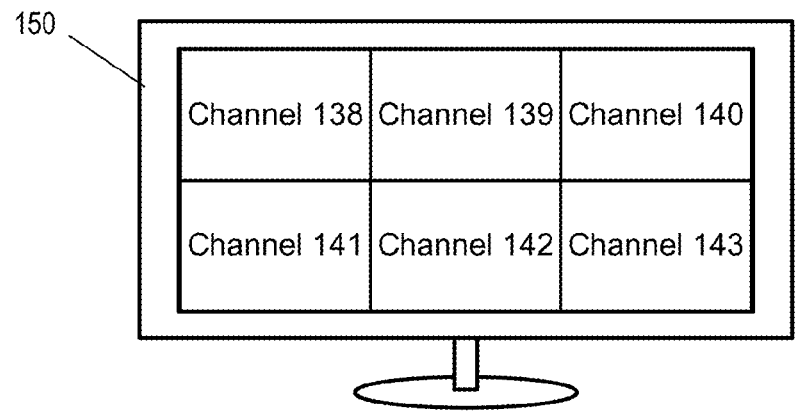

In step 505, the television receiver 130 may receive a channel-up or channel-down command from a television viewer via the remote control 170. The channel-up or channel-down command may correspond to a channel-up or channel-down button, page-up or page-down button, or other button or series of buttons input by the viewer via the remote control 170. After receiving the channel-up or channel-down command, the television receiver 130 may return to step 503, where an updated sequential block of television channels may be determined, received, and output within the same multi-video television channel scanning/surfing layout. For example, FIG. 6B shows an updated display following the receipt of a channel-up command from FIG. 6A. In this updated display, the sequential block of television channels has been shifted up by the number of channels in the layout (e.g., six), so that channels 150-155 are now displayed. FIG. 6C shows an updated display following the receipt of two channel-down commands from FIG. 6B. In this updated display, the sequential block of television channels has been shifted down twice by the number of channels in the layout (e.g., six), so that channels 138-143 are now displayed. As discussed above, if the number (N) of channels displayed within the layout changes (e.g., is reconfigured by the viewer and/or receiver), then the number of channels shifted up or down in the multi-video television channel scanning/surfing mode may change accordingly.

Figure 7:
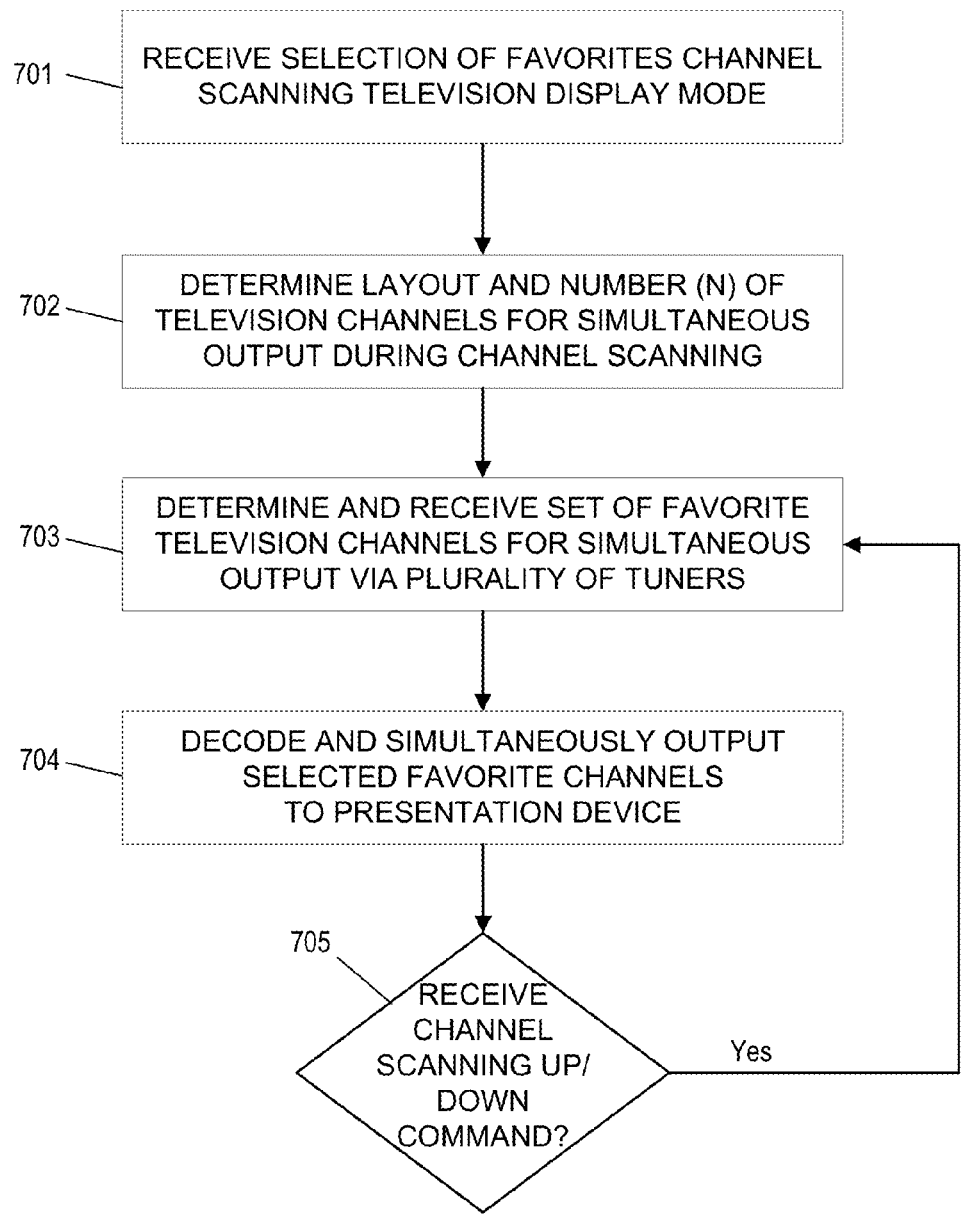
FIG. 7 shows a flow diagram illustrating an example process of providing a multi-video favorite channel scanning/surfing display mode, according to one or more embodiments of the disclosure.

Referring now to FIG. 7, a flow diagram is shown illustrating an example process of determining and implementing a multi-video television favorite channel scanning (or multi-video favorite channel surfing) display mode. As in FIG. 4, the steps in this process may be performed by a television receiver 130 and/or related components within the various television distribution systems described above. However, the techniques described herein for determining and outputting a multi-video favorite channel scanning display mode need not be limited to the specific systems and hardware implementations described above in FIGS. 1-3, but may be performed within other computing environments comprising other combinations of hardware and software components.

In step 701, the television receiver 130 may receive a selection of multi-video favorite channel scanning display mode (also referred to as multi-video favorite channel surfing mode). Step 701 may correspond to steps 401-402 in FIG. 4. In some cases, a multi-video favorite television channel scanning mode may be specifically selected by a television viewer, for example, by inputting a button (e.g., a "Favorites" button) or series of buttons on the remote control 170 to request multi-video favorite television channel scanning/surfing. In other cases, the multi-video favorite television channel scanning display mode may be determined automatically by the television receiver 130, as a default mode and/or based on the factors discussed above. For example, when a television viewer performs a standard favorite channel scanning/channel surfing action via remote control 170, the television receiver 130 may be configured to automatically initiate multi-video favorite channel scanning rather than single-video favorite channel scanning In step 702, the television receiver 130 may determine the layout and number (N) of television channels to be simultaneously output during the multi-video favorite television channel scanning/surfing mode. Step 702 may correspond to step 404 in FIG. 4. As discussed above, the layout data for a multi-video favorite television channel scanning/surfing mode (e.g., number of windows, window size, window configuration, etc.) may be stored television receiver 130. In some cases, the number (N) of television channels to be simultaneously output within the multi-video favorite television channel scanning/surfing display mode may be configurable by the viewer via a remote control 170 or user device 160, and/or may be configured by the television receiver 130 based on the hardware and software infrastructure of the television receiver 130 (e.g., number of tuners, decoding capabilities, etc.) and/or the associated presentation devices 150 (e.g., screen size, resolution, etc.).

Figure 8A:
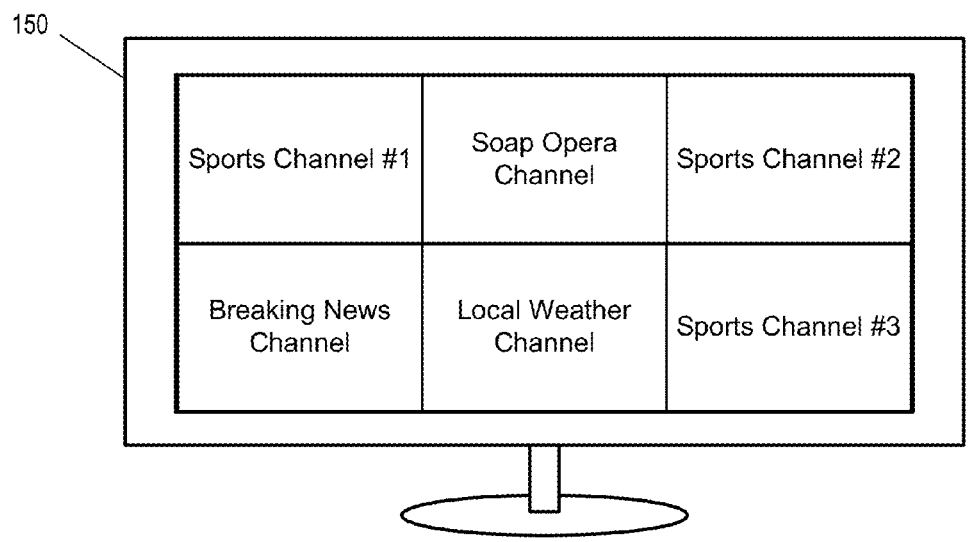
FIGS. 8A and 8B show a presentation device displaying an example layout for a multi-video favorite channel scanning/surfing mode, according to one or more embodiments of the disclosure.

In step 703, the television receiver 130 may determine and receive the specific set of favorite television channels to be output simultaneously, and in step 704, the received channels may be decoded, integrated into the determined layout for multi-video favorite television channel scanning/surfing, and output to one or more presentation devices 150. These steps may correspond to steps 405-407 in FIG. 4. When the determined display mode is a multi-video favorite television channel scanning/surfing mode, the television receiver 130 may first retrieve a set of viewer-defined favorite channels stored in the memory of the receiver 130. In some cases, the television receiver 130 may store multiple lists of favorite channels corresponding to different individual users. In such cases, the television receiver 130 may retrieve the appropriate user-specific favorites list in step 703. The television receiver 130 may then identify a sequential block within the list of favorite channels, for example, based on the most popular favorite channels, or the most recent favorite channel viewed, etc. For example, FIG. 8A shows an example layout for a multi-video favorite television channel scanning/surfing mode. In this example, the number (N) and layout of television channels determined (in step 702) is a six-channel 2×3 grid, and the favorite channels selected (in step 703) are a sequential block of channels stored within a favorite channels list on the receiver 130. The selected favorite channels may be received via the plurality of tuners 304 (in step 704), and then decoded and output to the presentation device 150 using the various receiver components and techniques discussed above.

Figure 8B:
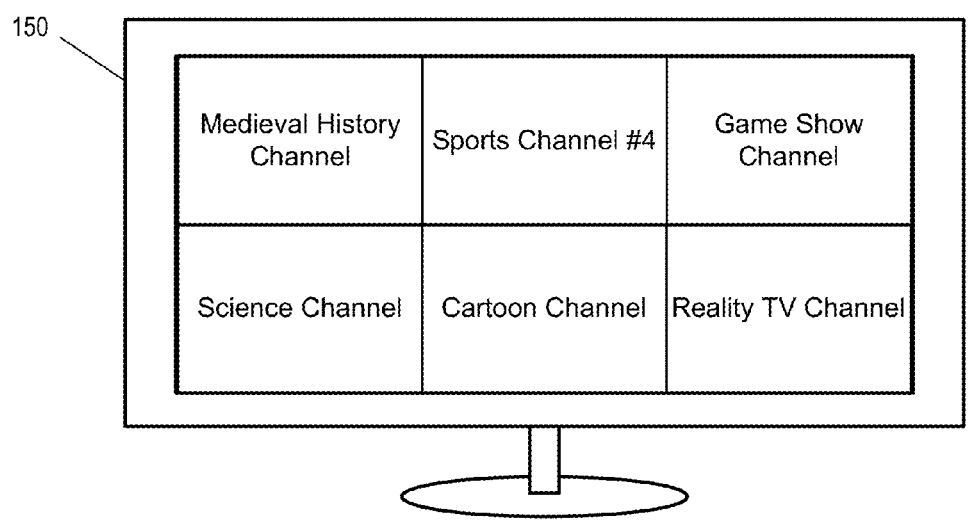

In step 705, the television receiver 130 may receive a channel-up or channel-down command from a television viewer via the remote control 170. The channel-up or channel-down command may correspond to a channel-up or channel-down button, page-up or page-down button, or other button or series of buttons input by the viewer via the remote control 170. After receiving the channel-up or channel-down command, the television receiver 130 may return to step 703, where an updated set of favorite channels may be determined, received, and output within the same multi-video favorite television channel scanning/surfing layout. For example, FIG. 8B shows an updated display following the receipt of a channel-up command from FIG. 8A. In this updated display, the next set of six favorite channels has been retrieved and is now displayed. As discussed above, if the number (N) of favorite channels displayed within the layout changes (e.g., is re-configured by the viewer and/or receiver), then the number of favorite channels retrieved and displayed in the multi-video favorite channel scanning/surfing mode may change accordingly.

Figure 9:
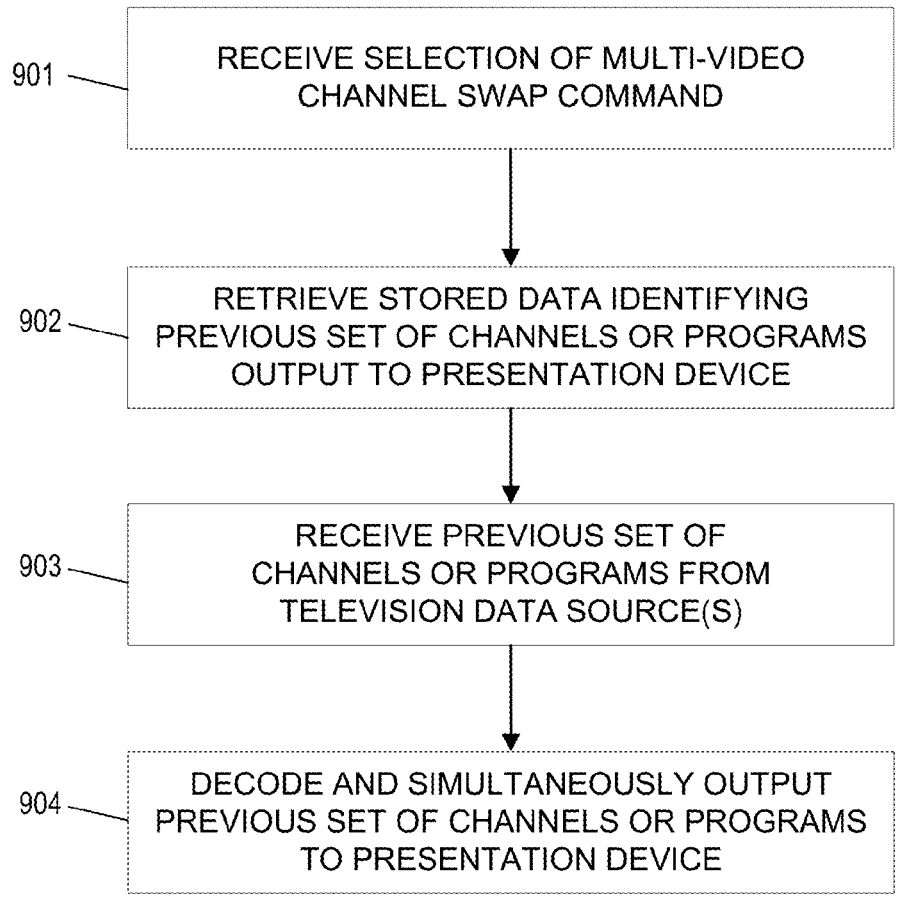
FIG. 9 shows a flow diagram illustrating an example process of performing a multi-video swap command, according to one or more embodiments of the disclosure.

Referring now to FIG. 9, a flow diagram is shown illustrating an example process of receiving and implementing a multi-video swap command. As discussed above, the steps in this process may be performed by a television receiver 130 and/or related components within the various television distribution systems described above. However, the techniques described herein for performing a multi-video swap command need not be limited to the specific systems and hardware implementations described above in FIGS.

1-3, but may be performed within other computing environments comprising other combinations of hardware and software components.

In step 901, the television receiver 130 may receive a multi-video swap command. The received swap command may be selected by a television viewer, for example, by inputting a button (e.g., a "Swap" or "Back" button) or series of buttons on the remote control 170. As discussed below, multi-video swap command may be used to swap between two different sets of multiple television selections. For example, in a multi-video display mode showing six channels (or other television selections) simultaneously, a multi-video swap command may be used to switch between two different set of six channels (or other television selections). Thus, multi-video swap command may be used with any of the multi-channel display modes described herein, including the multi-video television channel scanning mode and multi-video favorite television channel scanning mode, described in the examples above.

In step 902, in response to receiving the multi-video swap command, the television receiver 130 may retrieve data identifying the set of television selections previously output to the presentation device 150. For example, if the receiver 130 is currently outputting a multi-video display mode with six television channels, the receiver 130 may retrieve the six different television channels which were most recently viewed on the presentation device 150. Therefore, in embodiments where the multi-video swap command is supported, the receiver 130 may be configured to store the viewing histories of the television channels and/or programs previously output in each window in the multi-video layout (e.g., six windows in this example). Because the previously set of television selections within a multi-video display may include live television channels, delayed broadcast television channels/programs, streaming television channels/programs, on-demand television channels/programs, locally stored (e.g., DVR'd) programs, and/or any combination thereof, the viewing history data stored by the receiver 130 may identify any of these types of television selections from any television data source 141-144. Additionally, in some cases, the receiver 130 may store the viewing history on a per-window basis, so that the multi-video swap command will cause the last channel or program displayed on each individual window (e.g., each of the six windows in a 2×3 multi-video grid) to be retrieved and displayed within the same window in the layout. As noted above, each individual video window within the multi-video display may be set and changed independent of the other windows. Therefore, when a single window is updated in a multi-video display, the receiver 130 may update the television viewing history may for that particular window.

In step 903, the set of television selections determined in step 902 (e.g., the television selections previous displayed on each window in the current multi-video layout) may be received from the appropriate television data sources 141-144, and in step 904, the received television selections may be decoded and simultaneously output within their appropriate windows in the layout to the presentation device 150. These steps may correspond to steps 405-407 in FIG. 4. As noted above, when performing a multi-video swap and various supporting other multi-video display modes, the television receiver 130 may receive, decode, and output television selections from different television data sources 141-144, as well as other television data sources. For example, the set of television selections received, decoded, and output in steps 903-904 may include one or more live television channels received from a satellite television service provider 141, one or more live television channels received from a cable television service provider 142, one or more television programs requested/received from an Internet streaming television data source 143, one or more on-demand programs from an on-demand television data source 144, one or more programs retrieved from a DVR database 316, and/or any combination of television selections from these and other sources. As discussed above in reference to steps 405-407, the receiving and outputting of the television selections in steps 903-904 may be performed using various combinations of the hardware and software infrastructure of the television receiver 130 (e.g., local DVR database 316 and communication interface 328, tuners 304, decoders 326, demultiplexers 320, descramblers 324, network interfaces 306, and/or processors 302), depending on the television data sources and the number of television selections to be output in the current multi-video display mode.

Figure 10A:
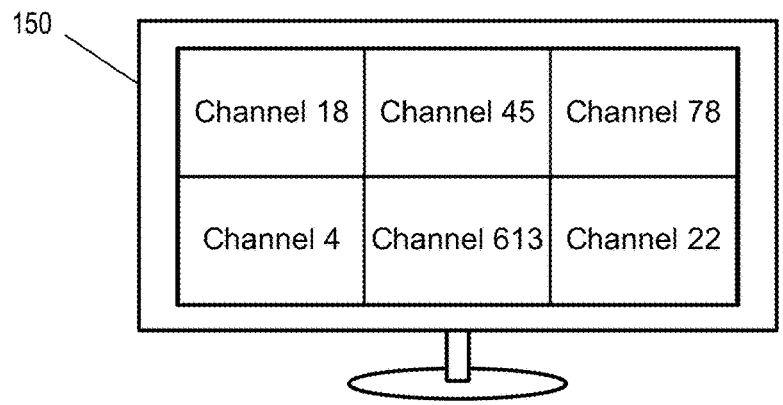
FIGS. 10A-10C show a presentation device demonstrating an example of a multi-video swap command, according to one or more embodiments of the disclosure.
Figure 10B:
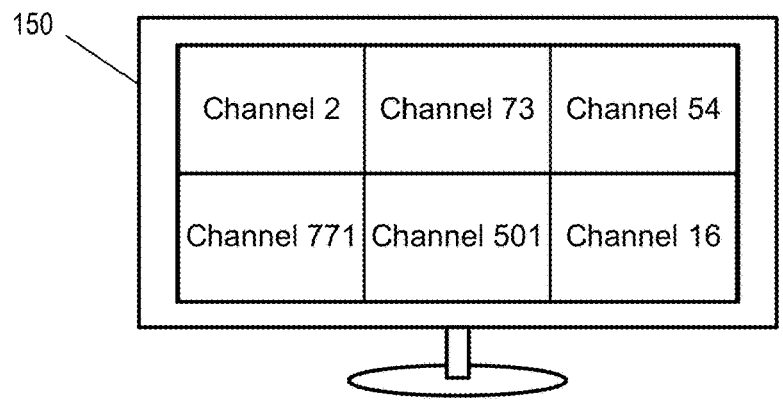
Figure 10C:
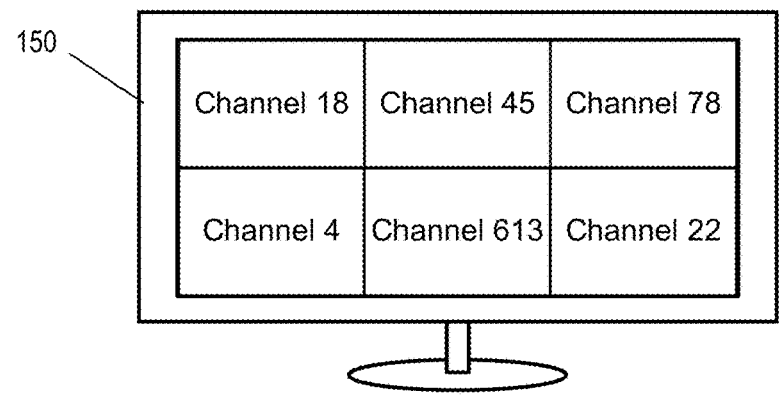

Referring briefly to FIGS. 10A-10C, three examples of multi-video displays are shown illustrating a multi-video swap command. Referring to FIG. 10A, a presentation device is shown displaying a multi-video display mode output, in this example, a 2×3 grid showing six television channels simultaneously. The display mode shown in this example may correspond to a multi-video channel scanning mode, a multi-video favorite channel scanning mode, or any other multi-video channel mode. As discussed above, each individual window in this multi-video display may be set and changed independent of the other windows, and the television receiver 130 may be configured to store viewing histories for each window in the multi-video display. Referring to FIG. 10B, the viewer has selected a multi-video swap command, causing the television receiver 130 to retrieve the previously viewed television selections for each of the six windows displayed in this display mode, and then to receive, decode, and output the previously viewed television selections. Referring to FIG. 10C, the viewer has selected the multi-video swap command a second time, causing the television receiver 130 to use the same techniques to revert to the original set of television selections output in FIG. 10A.

Figure 11:
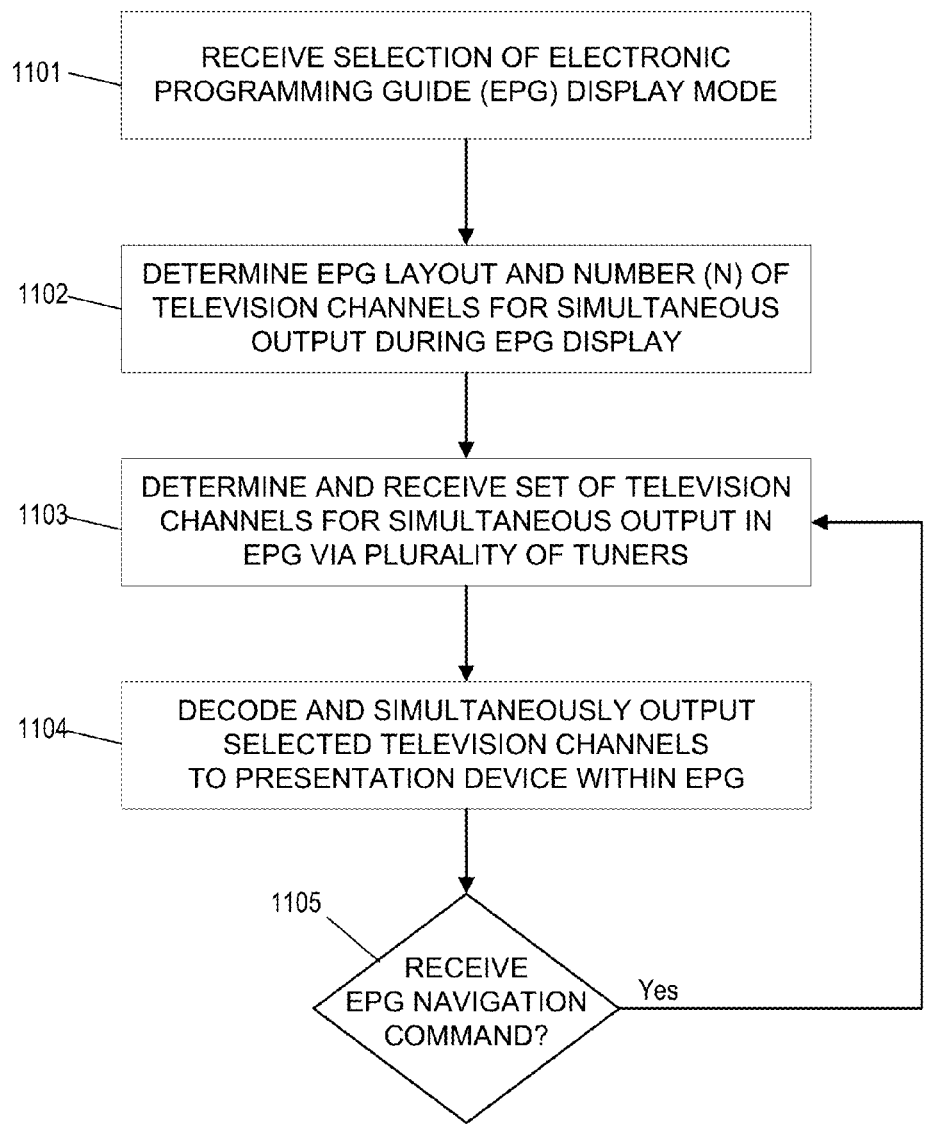
FIG. 11 shows a flow diagram illustrating an example process of providing a multi-video electronic programming guide (EPG) display mode, according to one or more embodiments of the disclosure.

Referring now to FIG. 11, a flow diagram is shown illustrating an example process of providing an multi-video electronic programming guide (EPG) display mode. As in FIG. 4, the steps in this process may be performed by a television receiver 130 and/or related components within the various television distribution systems described above. However, the techniques described herein for determining and outputting a multi-video EPG display mode need not be limited to the specific systems and hardware implementations described above in FIGS. 1-3, but may be performed within other computing environments comprising other combinations of hardware and software components.

In step 1101, the television receiver 130 may receive a selection of multi-video EPG display mode. Step 1101 may correspond to steps 401-402 in FIG. 4. In some cases, a multi-video EPG display mode may be specifically selected by a television viewer, for example, by inputting a button (e.g., a "Guide" button) or series of buttons on the remote control 170 to request a multi-video EPG. In other cases, the multi-video EPG display mode may be determined automatically by the television receiver 130, as a default mode and/or based on the factors discussed above. In some cases, the television receiver 130 may support both a standard single-channel EPG and one or more additional multi-channel EPGs.

In step 1102, the television receiver 130 may determine the layout and number (N) of television channels to be simultaneously output during the multi-video EPG display mode. Step 1102 may correspond to step 404 in FIG. 4. As discussed above, the layout data for a multi-video EPG display mode (e.g., number of windows, window size, window configuration, etc.) may be stored television receiver 130. In some cases, the number (N) of television channels to be simultaneously output within a multi-video EPG display mode may be configurable by the viewer via a remote control 170 or user device 160, and/or may be configured by the television receiver 130 based on the hardware and software infrastructure of the television receiver 130 (e.g., number of tuners, decoding capabilities, etc.) and/or the associated presentation devices 150 (e.g., screen size, resolution, etc.). Additionally, as noted above, multiple different multi-channel EPGs may be supported by a television receiver 130 in some cases. For example, the receiver 130 may provide different multi-channel EPGs that display different numbers (N) television channels simultaneously, and/or use different sizes, shapes, positions, and configurations of windows for displaying the simultaneous channels, and may allow the viewer to select a preferred multi-channel EPG for display.

Figure 12:
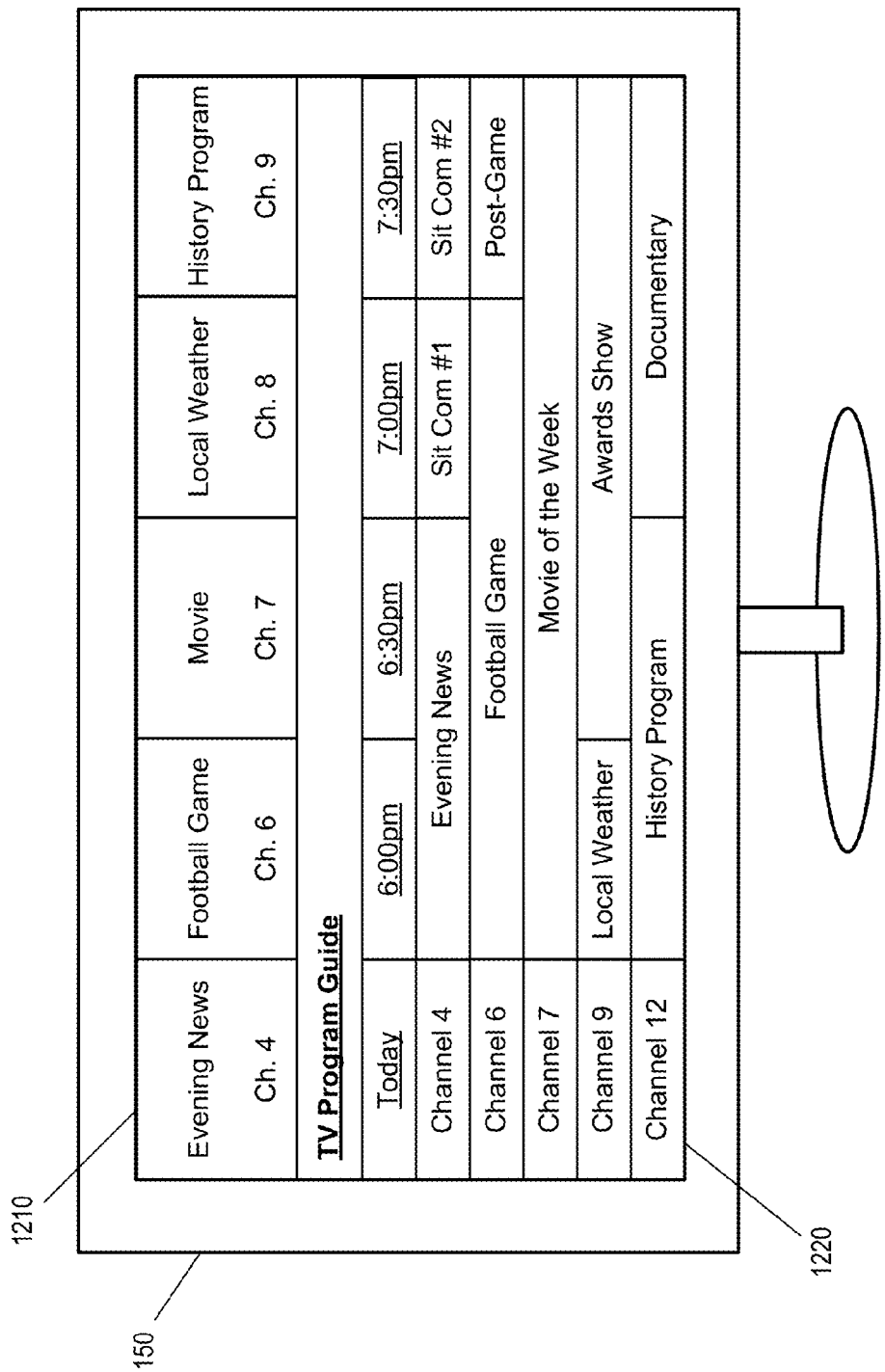
FIG. 12 shows a presentation device displaying an example layout and interface for a multi-video EPG display mode, according to one or more embodiments of the disclosure.

In step 1103, the television receiver 130 may determine and receive the specific set of channels to be output simultaneously within the EPG, and in step 1104, the received channels may be decoded, integrated into the EPG interface and output to one or more presentation devices 150. These steps may correspond to steps 405-407 in FIG. 4. When the determined display mode is a multi-video EPG, the television receiver 130 may retrieve the set of channels corresponding to the program listings displayed in the EPG. In some cases, these may include the current channel and a set of channels adjacent to the current channel being output by the receiver 130. For example, FIG. 12 shows an example layout for a multi-video EPG display mode in which five television channels are displayed within the upper portion of the screen 1210, corresponding to the first five program channel listings in the main lower portion 1220 of the EPG. In this example, the number (N) and layout of television channels determined (in step 1102) is based on the multi-video EPG(s) supported by the television receiver 130, and the channels selected (in step 1103) are a sequential block of five channels starting with current channel. The selected channels may be received via the plurality of tuners 304 (in step 1104), and then decoded and output to the presentation device 150 using the various receiver components and techniques discussed above.

In step 1105, the television receiver 130 may receive a channel navigation command within the multi-video EPG, for example, from a television viewer via the remote control 170. The navigation commands supported by the multi-video EPG may include, for instance, a channel-up or channel-down command, a page-up or a page-down command, a numeric input of a channel number, etc. After receiving the navigation command, the television receiver 130 may return to step 1103, where an updated set of channels to be displayed within the multi-video EPG may be determined, received, and output within the same multi-video EPG layout. For example, a channel-up or channel-down command received in step 1105 may cause the television receiver 130 to shift the program listing in the main portion of the EPG up or down by one row, retrieve a new television channel stream corresponding to the newly displayed channel in the program listing, shift the television selections being output in the top portion of the multi-video EPG one window to the right or left, and output the new television channel within the available window. As another example, a page-up command, page-down command, or numeric channel selection may cause the television receiver 130 to retrieve and display an entirely new set of television channels in steps 1103 and 1104.

Figure 13:
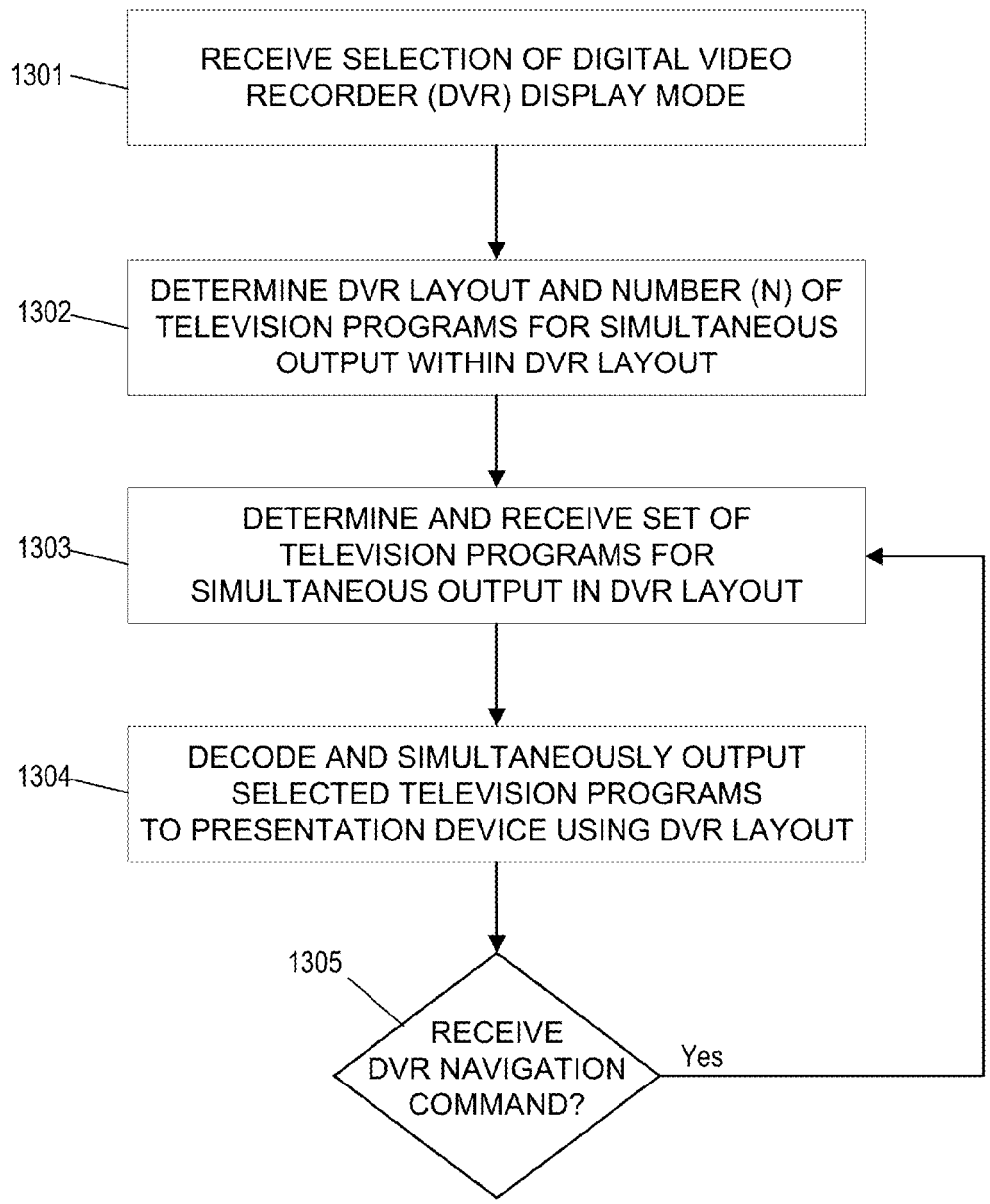
FIG. 13 shows a flow diagram illustrating an example process of providing a multi-video digital video recorder (DVR) display mode, according to one or more embodiments of the disclosure.

Referring now to FIG. 13, a flow diagram is shown illustrating an example process of providing an multi-video digital video recorder (DVR) display mode. As in FIG. 4, the steps in this process may be performed by a television receiver 130 and/or related components within the various television distribution systems described above. However, the techniques described herein for determining and outputting a multi-video DVR display mode need not be limited to the specific systems and hardware implementations described above in FIGS. 1-3, but may be performed within other computing environments comprising other combinations of hardware and software components.

In step 1301, the television receiver 130 may receive a selection of multi-video DVR display mode. Step 1301 may correspond to steps 401-402 in FIG. 4. In some cases, a multi-video DVR display mode may be specifically selected by a television viewer, for example, by inputting a button (e.g., a "DVR" button) or series of buttons on the remote control 170 to request a multi-video DVR. In other cases, the multi-video DVR display mode may be determined automatically by the television receiver 130, as a default mode and/or based on the factors discussed above. In some cases, the television receiver 130 may support both a standard single-program DVR display mode and one or more additional multi-program DVR display modes.

In step 1302, the television receiver 130 may determine the layout and number (N) of television programs to be simultaneously output during the multi-video DVR display mode. Step 1302 may correspond to step 404 in FIG. 4. As discussed above, the layout data for a multi-video DVR display mode (e.g., number of windows, window size, window configuration, etc.) may be stored television receiver 130. In some cases, the number (N) of television programs to be simultaneously output within a multi-video DVR display mode may be configurable by the viewer via a remote control 170 or user device 160, and/or may be configured by the television receiver 130 based on the hardware and software infrastructure of the television receiver 130 (e.g., number of tuners, decoding capabilities, etc.) and/or the associated presentation devices 150 (e.g., screen size, resolution, etc.). Additionally, as noted above, multiple different multi-program DVR display modes may be supported by a television receiver 130 in some cases. For example, the receiver 130 may provide different multi-program DVR interfaces that display different numbers (N) television programs simultaneously, and/or use different sizes, shapes, positions, and configurations of windows for displaying the simultaneous programs, and may allow the viewer to select a preferred multi-program DVR interface for display.

Figure 14:
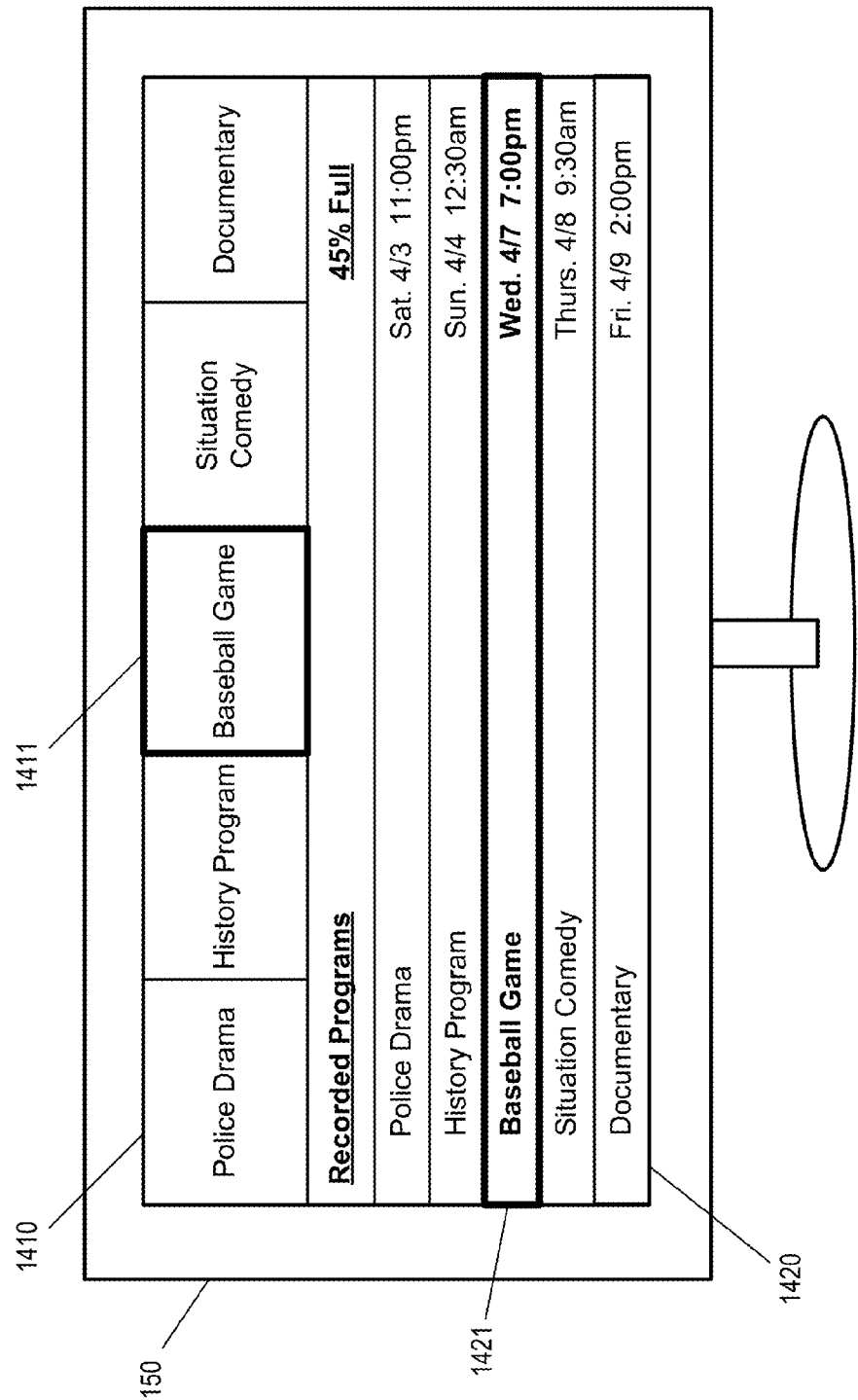
FIG. 14 shows a presentation device displaying an example layout and interface for a multi-video DVR display mode, according to one or more embodiments of the disclosure.

In step 1303, the television receiver 130 may determine the specific set of television programs to be output simultaneously within the DVR interface, and may retrieve the programs from the DVR database 316 or other local storage. In step 1304, the retrieved programs may be decoded, integrated into the DVR interface and output to one or more presentation devices 150. These steps may correspond to steps 405-407 in FIG. 4. When the determined display mode is a multi-video DVR, the television receiver 130 may retrieve the stored set of television programs corresponding to the program listings displayed in the DVR interface. For example, FIG. 14 shows an example layout for a multi-video DVR display mode in which five television programs are displayed within the upper portion of the screen 1410, corresponding to the first five television programs listed in the main lower portion of the DVR interface 1420. In this example, the number (N) and layout of television programs determined (in step 1302) is based on the multi-video DVR interface(s) supported by the television receiver 130, and the programs selected (in step 1303) are the five most recently recorded television programs. The selected television programs may be retrieved from the local DVR database 316 (in step 1304), and then decoded and output to the presentation device 150 using the various receiver components and techniques discussed above.

In step 1305, the television receiver 130 may receive a navigation (or control) command within the multi-video DVR interface, for example, from a television viewer via the remote control 170. The navigation (or control) commands supported by the multi-video DVR may include, for instance, moving/scrolling up or down by program or by page within the DVR interface, sorting the listing of television programs within the DVR interface, and/or deleting stored programs via the DVR interface. After receiving the navigation (or control) command, the television receiver 130 may return to step 1303, where an updated set of television programs may be determined, retrieved, and output within the same multi-video DVR interface. In some cases, the multi-video DVR interface may allow viewers to select (e.g., using arrow keys on the remote control 170) any of the specific windows outputting the television programs within the multi-video DVR. Selecting a particular window may make that window active, causing the television receiver 130 to output the audio from the television program shown in that window. For example, in FIG. 14, the television program listing 1421 ("Baseball Game") has been selected within the DVR interface listings, causing audio from window 1411 program to be output by the receiver 130. Once a television program has been initially selected within the multi-video DVR interface, a second viewer command may select the program for full-screen display, terminating the multi-video DVR interface.

Figure 15:
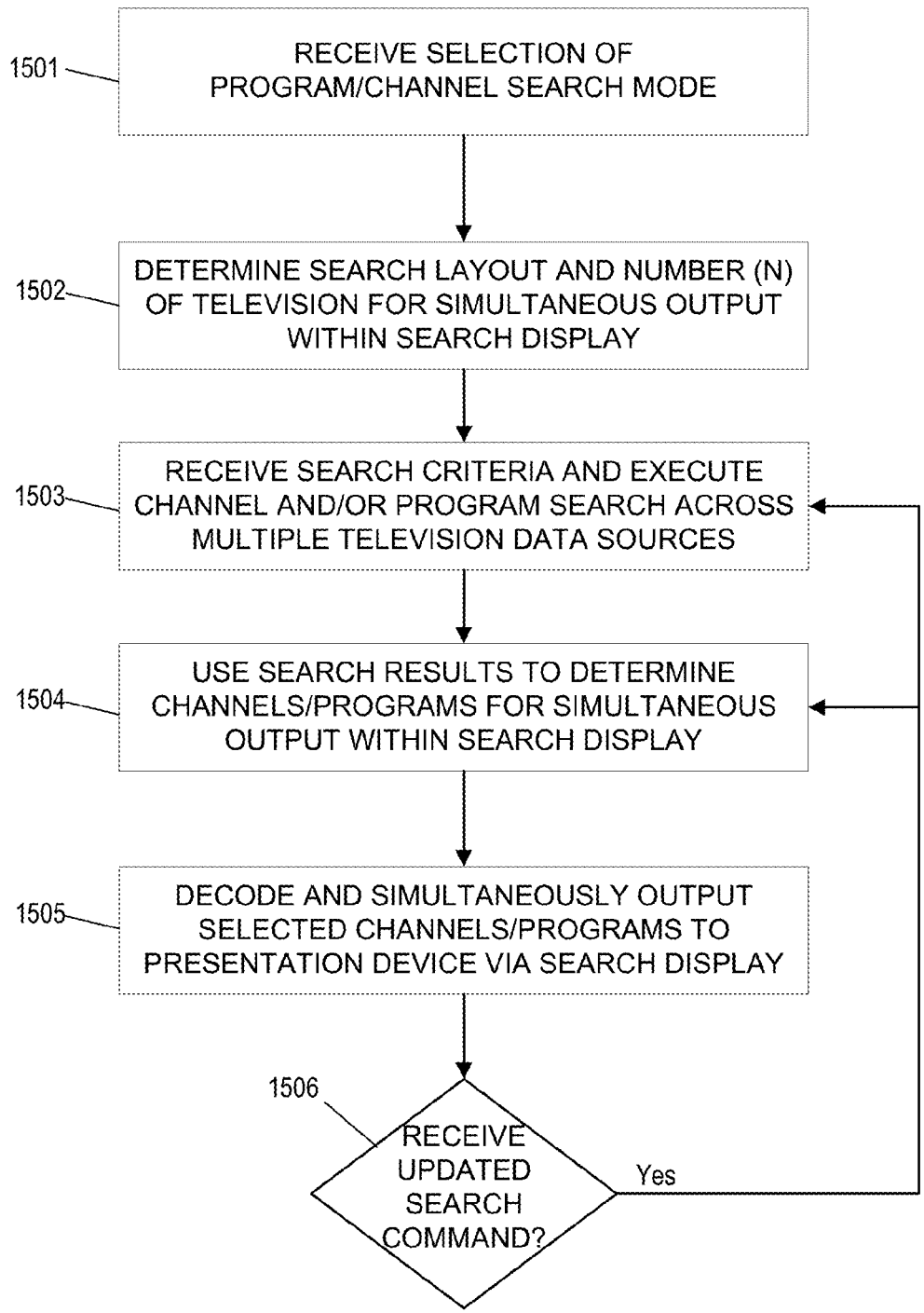
FIG. 15 shows a flow diagram illustrating an example process of providing a multi-video search display mode, according to one or more embodiments of the disclosure.

Referring now to FIG. 15, a flow diagram is shown illustrating an example process of providing an multi-video search display mode. As in FIG. 4, the steps in this process may be performed by a television receiver 130 and/or related components within the various television distribution systems described above. However, the techniques described herein for determining and outputting a multi-video search display mode need not be limited to the specific systems and hardware implementations described above in FIGS. 1-3, but may be performed within other computing environments comprising other combinations of hardware and software components.

In step 1501, the television receiver 130 may receive a search request within a multi-video display mode. Step 1501 may correspond to steps 401-402 in FIG. 4. For example, a viewer may invoke a multi-video search interface provided by the television receiver 130 and then input a search string and/or other search criteria into the search interface using a remote control 170. For example, in FIG. 16, an example layout is shown for a multi-video search interface, including a input window 1605 to allow the user to input a text search string.

In step 1502, the television receiver 130 may determine the layout and number (N) of television selections (e.g., television channels and/or programs) to be simultaneously output during the multi-video search display mode. Step 1502 may correspond to step 404 in FIG. 4. As discussed above, the layout data for a multi-video search display mode (e.g., number of windows, window size, window configuration, etc.) may be stored television receiver 130. In some cases, the number (N) of television selections to be simultaneously output within a multi-video search results interface may be configurable by the viewer via a remote control 170 or user device 160, and/or may be configured by the television receiver 130 based on the hardware and software infrastructure of the television receiver 130 (e.g., number of tuners, decoding capabilities, etc.) and/or the associated presentation devices 150 (e.g., screen size, resolution, etc.). Additionally, multiple different multi-video search interfaces display modes may be supported by a television receiver 130 in some cases. For example, the receiver 130 may provide different multi-video search results interfaces that display different numbers (N) television programs simultaneously, and/or use different sizes, shapes, positions, and configurations of windows for displaying the simultaneous television selections, and may allow the viewer to select a preferred multi-video search interface for display.

In step 1503, the television receiver 130 may receive and/or execute the search criteria received from the viewer, and may retrieve a number of television selections satisfying the search criteria. In some embodiments, the television selections matching the search criteria may include a combination of television channels and television programs from one or more different television data sources. For example, the search results may include one or more channels/programs from a satellite television service provider 141, one or more channels/programs from a cable television service provider 141, one or more channels/programs available via an Internet streaming television data source 143, one or more on-demand programs from an on-demand television data source 144, one or more previously stored programs retrieved from a DVR database 316, and/or any combination of television selections from these and other sources.

In step 1504, the television receiver 130 may compile and sort the search results received in step 1503, to determine which television selections should be simultaneously output within the multi-video search results interface. The television receiver 130 may sort the search results in step 1504 based on one or more factors, such as relevance and/or release date (e.g., broadcast date, publication date, etc.) of the television selections. In some cases, the determination in step 1504 also may include filtering and/or excluding the television selections that are unavailable to the television receiver 130, such as matching results from television data sources or channels to which the receiver 130 is not subscribed. In some embodiments, the television receiver 130 also may determine the television selections to display in step 1504 by identifying preferred and not preferred television data sources, for example, based on differences in bandwidth, download speed, video/audio quality, subscription costs, data limits and overage costs, and/or user configurable preferences or rankings for particular television data sources over other television data sources. In such embodiments, the television receiver 130 may filter or weight the search results, so that television selections from one or more preferred television data sources are displayed within the multi-video search results interface before television selections from other television data sources.

Figure 16:
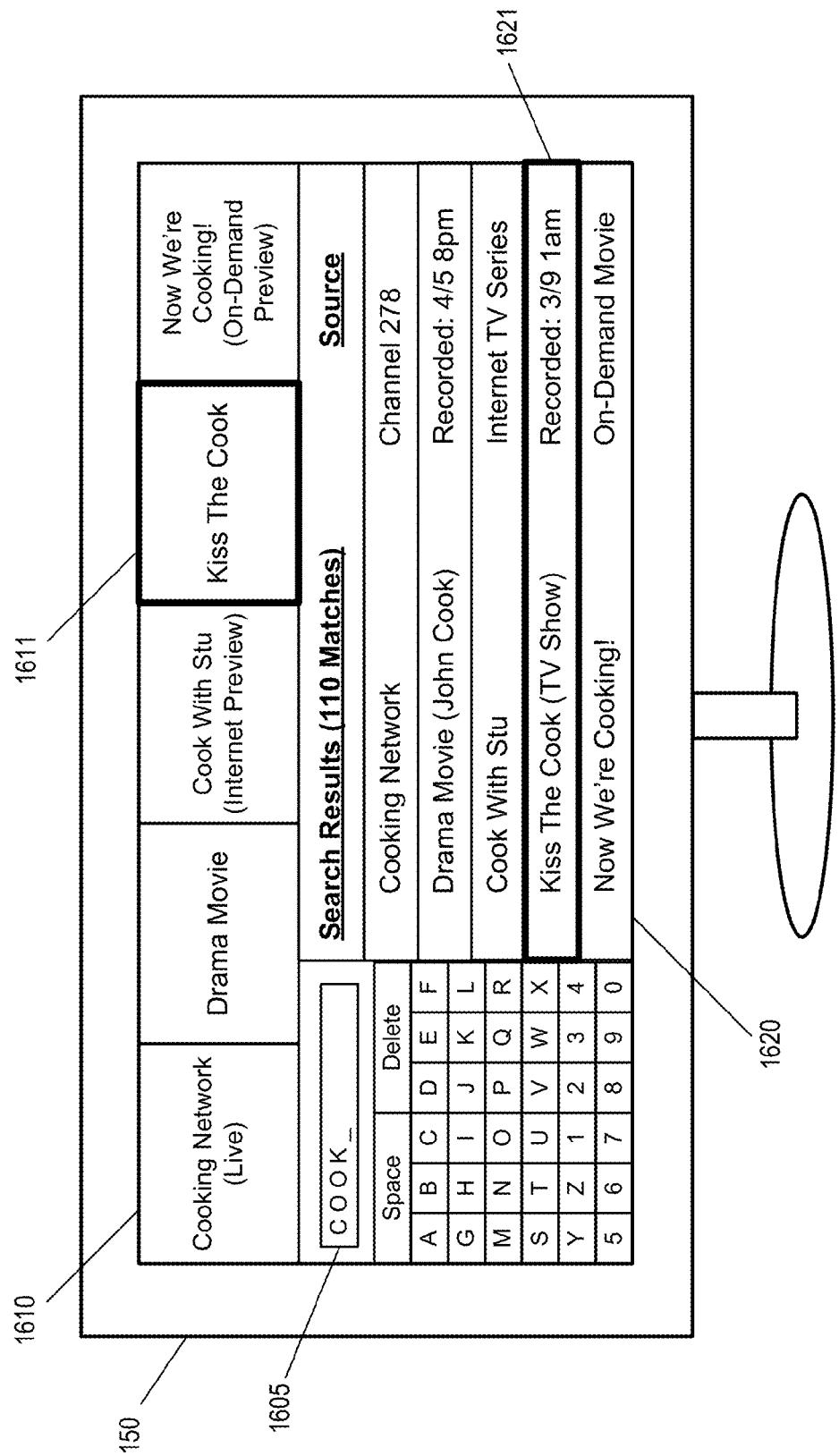
FIG. 16 shows a presentation device displaying an example layout and search interface for a multi-video search display mode, according to one or more embodiments of the disclosure.

In step 1505, the television receiver 130 may receive/retrieve, decode, and output the television selections determined in step 1504 to one or more presentation devices 150, within the multi-video search results interface. This step may correspond to steps 406-407 in FIG. 4. For example, FIG. 16 shows an example layout for a multi-video search display mode in which five television programs are displayed within the upper portion of the screen 1610, corresponding to the first five television programs listed in the main lower portion of the search results interface 1620. In this example, the number (N) and layout of television programs determined (in step 1502) is based on the multi-video search interface(s) supported by the television receiver 130, and the programs selected (in step 1504) may be the five most relevant search results across all available television data sources. The television selections may be received via the plurality of tuners 304, requested/received via various network interfaces 306, and/or retrieved from the DVR database 316, depending on the underlying data source providing each television selection. The received/retrieved television selections then may be decoded and output to the presentation device 150 using the various receiver components and techniques discussed above.

In step 1506, the television receiver 130 may receive a navigation (or control) command within the multi-video search interface, for example, from a television viewer via the remote control 170. The navigation (or control) commands supported by the multi-video search interface may include, for instance, moving/scrolling up or down by program or by page within the search results interface, re-sorting the listing of search results within the search interface, and/or modifying the search criteria. After receiving the navigation (or control) command, the television receiver 130 may return to step 1503 or step 1504, either to perform an updated search based on new search criteria (step 1503), or to re-sort the existing search results and determine the updated set of television selections to be output within the multi-video search interface (step 1504). As described above, in some cases, the multi-video search interface may allow viewers to select (e.g., using arrow keys on the remote control 170) any of the specific windows outputting the television selections within the multi-video search interface. Selecting a particular window may make that window active, causing the television receiver 130 to output the audio from the television program shown in that window. For example, in FIG. 16, the search result 1621 ("Kiss The Cook") has been selected within the search result listings, causing audio from window 1611 program to be output by the receiver 130. Once a television selection has been initially selected within the multi-video search interface, a second viewer command may initiate playback of the television selection in a full-screen display, terminating the multi-video search interface.

Additionally, in some embodiments, the television receiver 130 may support requests from viewers for additional information relating to any of the television selections (e.g., channels or programs) output within any of the multi-video display modes described herein. For instance, referring to the examples of FIGS. 6A-6C, the television receiver 130 may receive data from control device 170 or other controller device selecting one of the six television output windows. In response, the television receiver 130 may determining a television data source associated with the selected television output window, and may retrieve and display additional information relating to the selected television output window. Depending on the television data source, the additional information relating to the selected output window may retrieved from a channel stream of a cable or satellite provider, retrieved from a DVR database, etc. In some cases, a data request may be specifically generated and transmitted by the television receiver 130 to retrieve the additional information about the selected output window.

Figure 17:
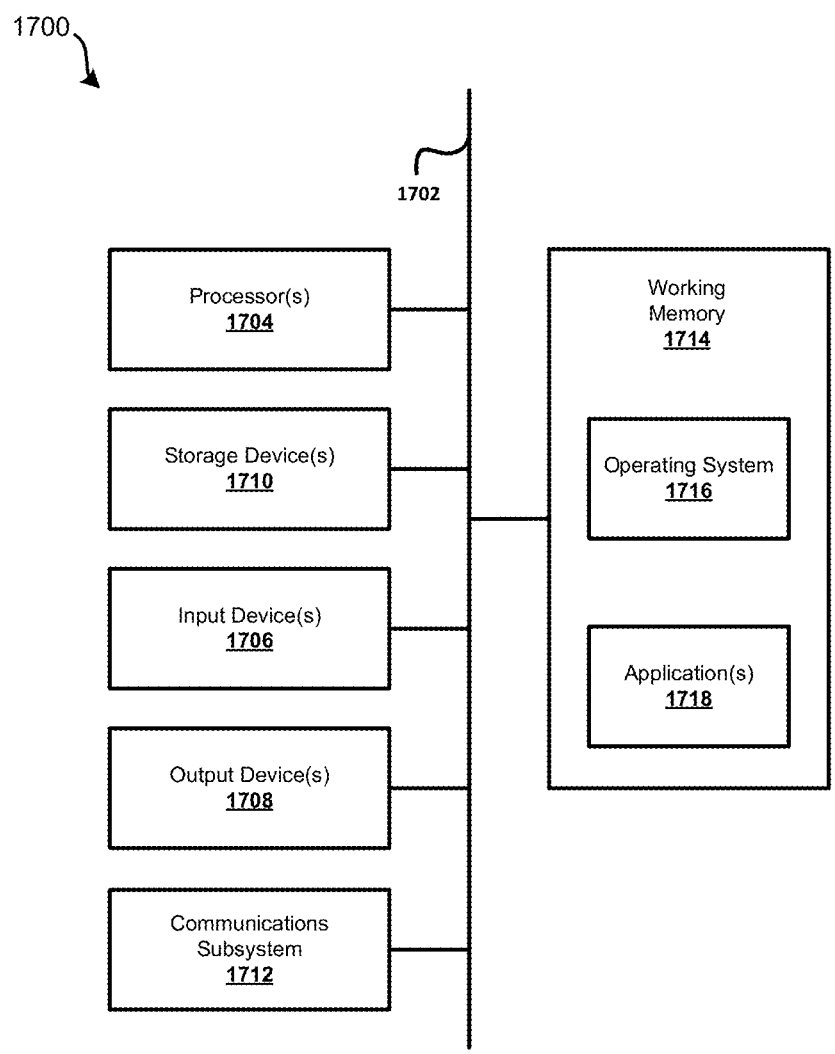
FIG. 17 is a block diagram illustrating an example computing system upon which various features of the present disclosure may be implemented.

Referring now to FIG. 17, an example is shown of a computer system or device 1700 in accordance with the disclosure. Examples of computer systems or devices 1700 may include systems, controllers, monitors, or the like, an enterprise server, blade server, desktop computer, laptop computer, tablet computer, personal data assistant, smartphone, gaming console, set-top box, television receiver, and/or any other type of machine configured for performing calculations. Any particular one of the previously-described computing devices may be wholly or at least partially configured to exhibit features similar to the computer system 1700, such as any of the respective elements or components of at least FIGS. 1-3. In this manner, any of one or more of the respective elements of those figures may be configured and/or arranged, wholly or at least partially, for providing the various multi-video display modes discussed above. Still further, any of one or more of the respective elements of at least FIGS. 1-3 may be configured and/or arranged to include computer-readable instructions that, when executed, instantiate and implement various functionality described herein (e.g., one or more multi-video display mode engines 110 and/or services 220).

The computer device 1700 is shown comprising hardware elements that may be electrically coupled via a bus 1702 (or may otherwise be in communication, as appropriate). The hardware elements may include a processing unit with one or more processors 1704, including without limitation one or more general-purpose processors and/or one or more special-purpose processors (such as digital signal processing chips, graphics acceleration processors, and/or the like); one or more input devices 1706, which may include without limitation a remote control, a mouse, a keyboard, and/or the like; and one or more output devices 1708, which may include without limitation a presentation device (e.g., television), a printer, and/or the like.

The computer system 1700 may further include (and/or be in communication with) one or more non-transitory storage devices 1710, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 1700 might also include a communications subsystem 1712, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM (Global System for Mobile Communications), W-CDMA (Wideband Code Division Multiple Access), LTE (Long Term Evolution), etc., and/or the like. The communications subsystem 1712 may permit data to be exchanged with a network (such as the network described below, to name one example), other computer systems, and/or any other devices described herein. In many examples, the computer system 1700 will further comprise a working memory 1714, which may include a random access memory and/or a read-only memory device, as described above.

The computer device 1700 also may comprise software elements, shown as being currently located within the working memory 1714, including an operating system 1716, device drivers, executable libraries, and/or other code, such as one or more application programs 1718, which may comprise computer programs provided by various examples, and/or may be designed to implement methods, and/or configure systems, provided by other examples, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 1710 described above. In some cases, the storage medium might be incorporated within a computer system, such as computer system 1700. In other examples, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 1700 and/or might take the form of source and/or installable code, which, upon compilation and/or installation on the computer system 1700 (e.g., using any of a variety of generally available compilers, installation programs, compression/decompression utilities, etc.), then takes the form of executable code.

It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some examples may employ a computer system (such as the computer device 1700) to perform methods in accordance with various examples of the disclosure. According to a set of examples, some or all of the procedures of such methods are performed by the computer system 1700 in response to processor 1704 executing one or more sequences of one or more instructions (which might be incorporated into the operating system 1716 and/or other code, such as an application program 1718) contained in the working memory 1714. Such instructions may be read into the working memory 1714 from another computer-readable medium, such as one or more of the storage device(s) 1710. Merely by way of example, execution of the sequences of instructions contained in the working memory 1714 may cause the processor(s) 1704 to perform one or more procedures of the methods described herein.

The terms "machine-readable medium" and "computer-readable medium," as used herein, may refer to any non-transitory medium that participates in providing data that causes a machine to operate in a specific fashion. In an example implemented using the computer device 1700, various computer-readable media might be involved in providing instructions/code to processor(s) 1704 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 1710. Volatile media may include, without limitation, dynamic memory, such as the working memory 1714.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 1704 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 1700.

The communications subsystem 1712 (and/or components thereof) generally will receive signals, and the bus 1702 then might carry the signals (and/or the data, instructions, etc. carried by the signals) to the working memory 1714, from which the processor(s) 1704 retrieves and executes the instructions. The instructions received by the working memory 1714 may optionally be stored on a non-transitory storage device 1710 either before or after execution by the processor(s) 1704. It should further be understood that the components of computer device 1700 can be distributed across a network. For example, some processing may be performed in one location using a first processor while other processing may be performed by another processor remote from the first processor. Other components of computer system 1700 may be similarly distributed. As such, computer device 1700 may be interpreted as a distributed computing system that performs processing in multiple locations. In some instances, computer system 1700 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages or steps or modules may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A television receiver, comprising:
   a plurality of tuners configured to receive signals from one or more television data sources;
   one or more decoders configured to decode television signals received via the plurality of tuners;
   one or more processors; and
   memory communicatively coupled with and readable by the one or more processors and having stored therein processor-readable instructions which, when executed by the one or more processors, cause the television receiver to:
      receive a first selection of a channel scanning display mode from a plurality of multi-video display modes available at the television receiver, wherein:
         the channel scanning display mode corresponds to a multi-video display mode in which six or more television channels of a sequential block of television channels are displayed simultaneously and only the six or more television channels of the sequential block of television channels are presented; and
         the number of simultaneously displayed television channels is based on preference data received by the television receiver from a television service provider;
      in response to the received selection of the channel scanning mode, determine a first set of six or more sequential television channels for simultaneous presentation on a presentation device;
      for each of the first set of six or more television selections, receive and decode the corresponding television channel into a format suitable for output to the presentation device;
      determine a first screen layout for simultaneously outputting the first set of six or more television channels to the presentation device;
      output the decoded television channels corresponding to the first set of six or more television selections to the presentation device using the determined first screen layout;
      in response to a channel-up, page-up, channel-down, or page-down command, output a second set of six or more sequential television channels for simultaneous presentation on the presentation device, wherein channel numbers of the second set are incremented by a number of television channels presented in the first screen layout;
      receive a second selection of an electronic programming guide (EPG) display mode from the plurality of multi-video display modes available at the television receiver, wherein the EPG display mode corresponds to a different layout and a different number of simultaneous displayed television channels or television programs than the channel scanning display mode;
      determine a third set of three or more television channels for simultaneous presentation on the presentation device along with simultaneous presentation of an EPG based on the second selection, each of the television channels in the third set corresponding to a different television channel listed in a displayed portion of the EPG;
      for each of the third set of three or more television channels, receive and decode the corresponding television channel into a format suitable for output to the presentation device;
      determine a second screen layout for simultaneously outputting the third set of three or more television channels to the presentation device;
      output the decoded television channels corresponding to the third set of three or more television channels to the presentation device using the determined second screen layout;
      receive a multi-video swap command based on a single remote control button press; and
      switch, in response to the multi-video swap command, from the EPG display mode in the second screen layout to the channel scanning display mode that outputs the second set of six or more sequential television channels for presentation in the first screen layout.

2. The television receiver of claim 1, the memory having stored therein further processor-readable instructions which, when executed by the one or more processors, cause the television receiver to:
   downconvert each of the first set of six or more television channels, before outputting the decoded television channels corresponding to the first set of six or more television channels to the presentation device; and
   downconvert each of the third set of or more television channels, before outputting the decoded television channels corresponding to the third set of or more television channels to the presentation device.

3. A method, comprising:
   receiving, by a television receiver device, a first selection of a channel scanning display mode from a plurality of multi-video display modes available at the television receiver device, the selected channel scanning display mode corresponding to a display mode in which six television channels are displayed simultaneously and only the six or more sequential blocks of television channels are presented, wherein:
the number of simultaneously displayed television channels is based on preference data received by the television receiver device from a television service provider;
determining, by the television receiver device and in response to the received selection of the channel scanning display mode, a first set of six sequential television channels for simultaneous presentation on a presentation device;
receiving and decoding, by the television receiver device, the corresponding television channels into a format suitable for output to the presentation device;
determining, by the television receiver device, a first screen layout for simultaneously outputting the first set of six television channels to the presentation device;
outputting, by the television receiver device, the decoded television channels corresponding to the first set of six television channels to the presentation device using the determined first screen layout;
in response to a channel-up, page-up, channel-down, or page-down command, outputting a second set of six or more sequential television channels for simultaneous presentation on the presentation device, wherein channel numbers of the second set are incremented by a number of television channels presented in the first screen layout;
receiving, by the television receiver device, data from a controller device corresponding to a second selection of an electronic programming guide (EPG) display mode from the plurality of multi-video display modes available at the television receiver device, wherein the EPG multi-video display mode corresponds to a different layout and a different number of simultaneous displayed television channels than the channel scanning multi-video display mode;
determining, by the television receiver device, a third set of three or more television channels for simultaneous presentation on the presentation device along with simultaneous presentation of an EPG based on the data received from the controller device, each of the television channels in the third set corresponding to a different television channel listed in a displayed portion of the EPG, wherein the EPG comprises a grid of a plurality of television channels, a plurality of times, and a plurality of television programs being broadcast on the plurality of television channels at the plurality of times, wherein the EPG comprises a grid listing: a plurality of television channels and a plurality of times, the grid indicating a plurality of television programs being broadcast on the plurality of television channels at the plurality of times;
receiving and decoding, by the television receiver device, the corresponding television channel for each of the third set of three or more television channels, into a format suitable for output to the presentation device;
determining a second screen layout for simultaneously outputting the third set of three or more television channels to the presentation device;
outputting, by the television receiver device, the decoded television channels corresponding to the third set of three or more television channels to the presentation device using the determined second screen layout;
receiving a multi-video swap command based on a single remote control button press; and
switching from the EPG display mode in the second screen layout to the channel scanning display mode that outputs the second set of six or more sequential television channels for presentation in the first screen layout in response to the multi-video swap command.

4. The method of claim 3, further comprising:
downconverting each of the first set of six or more television channels, before outputting the decoded television channels corresponding to the first set of six television channels to the presentation device; and
downconverting each of the third set of or more television channels, before outputting the decoded television channels corresponding to the updated set of three or more television channels to the presentation device.

* * * * *